United States Patent
Witt

[11] Patent Number: 6,061,786
[45] Date of Patent: May 9, 2000

[54] PROCESSOR CONFIGURED TO SELECT A NEXT FETCH ADDRESS BY PARTIALLY DECODING A BYTE OF A CONTROL TRANSFER INSTRUCTION

[75] Inventor: David B. Witt, Austin, Tex.

[73] Assignee: Advanced Micro Devices, Inc., Sunnyvale, Calif.

[21] Appl. No.: 09/065,238

[22] Filed: Apr. 23, 1998

Related U.S. Application Data

[60] Provisional application No. 60/065,878, Nov. 17, 1997.

[51] Int. Cl.⁷ .................................................. G06F 9/38
[52] U.S. Cl. .......................................... 712/237; 712/213
[58] Field of Search .................................. 712/207, 237, 712/213

[56] References Cited

U.S. PATENT DOCUMENTS

| | | | |
|---|---|---|---|
| 4,502,111 | 2/1985 | Riffe et al. | 712/204 |
| 5,101,341 | 3/1992 | Circello et al. | 712/213 |
| 5,129,067 | 7/1992 | Johnson | 712/213 |
| 5,155,820 | 10/1992 | Gibson | 712/210 |
| 5,233,696 | 8/1993 | Suzuki | 712/204 |
| 5,313,605 | 5/1994 | Huck et al. | 711/3 |
| 5,337,415 | 8/1994 | DeLano et al. | 712/213 |
| 5,438,668 | 8/1995 | Coon et al. | 712/204 |
| 5,459,844 | 10/1995 | Eickemeyer et al. | 712/213 |

(List continued on next page.)

FOREIGN PATENT DOCUMENTS

| | | |
|---|---|---|
| 0 238 810 A2 | 9/1987 | European Pat. Off. . |
| 0 423 726 A2 | 4/1991 | European Pat. Off. . |
| 0 498 654 A2 | 12/1992 | European Pat. Off. . |
| 0 651 322 A1 | 5/1995 | European Pat. Off. . |
| 0 651 324 | 5/1995 | European Pat. Off. . |
| 0 718 758 | 6/1996 | European Pat. Off. . |
| 2 263 987 | 8/1993 | United Kingdom . |
| 96/10783 | 4/1996 | WIPO . |

OTHER PUBLICATIONS

XP000212073 Ditzel, et al., "Branch Folding in the CRISP Microprocessor: Reducing Branch Delay to Zero," AT&T Bell Laboratories, 14th Annual International Symposium on Computer Architecture, Jun. 2–5, 1987, pp. 2–9.

XP000364329 Gonzalez, et al., "Reducing Branch Delay to Zero in Pipelined Processors," IEEE Transactions on Computers, vol. 42, No. 3, Mar. 1993, pp. 363–371.

Tamasulo, "An Efficient Algorithm For Exploiting Multiple Arithmetic Units," 1967, IBM Journal, pp. 25–33.

Minagawa, "Predecoding Mechanism for Superscalar Architecture," 1991, IEEE Publication, pp. 21–24.

Primary Examiner—Kenneth S. Kim
Attorney, Agent, or Firm—Conley, Rose & Tayon; Lawrence J. Merkel

[57] ABSTRACT

A processor employs predecoding to identify instruction boundaries as well as to identify which instructions are branch instructions. In one embodiment, the processor stores a start bit corresponding to each instruction byte in the instruction cache with the instruction bytes. The start bit identifies which instruction bytes are the start of an instruction. Additionally, the processor stores a control transfer bit corresponding to each instruction byte. The control transfer bit corresponding to each instruction byte identified as the start of an instruction is used to indicate whether or not the instruction is a branch instruction. Additionally, the byte identified as the start of the branch instruction via the start bit and control transfer bit is partially decoded upon fetch of the branch instruction from the instruction cache to select the branch target address corresponding to the branch instruction from one of several possible target addresses. In one embodiment, partially decoding the initial byte of a branch instruction (as identified by the corresponding start and control transfer bits) allows for selection of the target address from three sources: a relative target address encoded into a byte succeeding the initial byte within a cache line, a return address from a return stack, and a sequential address. In one particular embodiment, the four most significant bits of the initial byte of the branch instruction are decoded to select one of the three source targets.

37 Claims, 15 Drawing Sheets

U.S. PATENT DOCUMENTS

| | | | |
|---|---|---|---|
| 5,488,710 | 1/1996 | Sato et al. | 711/125 |
| 5,499,204 | 3/1996 | Barrera et al. | 365/49 |
| 5,513,330 | 4/1996 | Stiles | 712/204 |
| 5,557,271 | 9/1996 | Rim et al. | 341/67 |
| 5,559,975 | 9/1996 | Christie et al. | 712/230 |
| 5,560,028 | 9/1996 | Sachs et al. | 712/23 |
| 5,566,298 | 10/1996 | Boggs et al. | 714/10 |
| 5,586,276 | 12/1996 | Growchowski et al. | 712/204 |
| 5,586,277 | 12/1996 | Brown | 712/210 |
| 5,598,544 | 1/1997 | Oshima | 712/204 |
| 5,600,806 | 2/1997 | Brown et al. | 712/204 |
| 5,625,787 | 4/1997 | Mahin et al. | 712/204 |
| 5,630,082 | 5/1997 | Yao et al. | 712/213 |
| 5,644,744 | 7/1997 | Mahin et al. | 712/207 |
| 5,689,672 | 11/1997 | Witt et al. | 712/213 |
| 5,692,168 | 11/1997 | McMahan | 712/237 |
| 5,729,707 | 3/1998 | Maki | 712/207 |
| 5,758,114 | 5/1998 | Johnson et al. | 712/204 |
| 5,758,116 | 5/1998 | Lee et al. | 712/210 |
| 5,935,238 | 8/1999 | Talcott et al. | 712/206 |

| Opcode | Selection | Note |
|---|---|---|
| Jcc rel 8 bit (7x, Ex) | first branch relative target | none |
| Return (Cx) | return address | none |
| Call/Jmp relative (Ex) | first branch relative target | Correct if not 8 bit displacement |
| Call/Jmp Indirect (Fx) | sequential | Signal L1 Prefetch Control |
| 32 bit relative (0x) | first branch relative target | Signal L1 Prefetch Control, Correct fetch next cycle |

160

| First Branch Target | First Branch Prediction | Second Branch Target | Second Branch Prediction | Result |
|---|---|---|---|---|
| Backward | Taken | x | x | Squash all instructions after first branch, Fetch target (L0) |
| Forward Small | Taken | Backward | Taken[1] | Squash instructions skipped by first and after 2nd, fetch 2nd Target (L0) |
| Forward Small | Taken | Forward Small | Taken[1] | Squash instructions skipped by each branch, fetch 2nd Target (L0) |
| Forward Small | Taken | Other | Taken[1] | Squash instructions skipped by each branch, fetch 2nd Target (L1) |
| Forward Small | Taken | x | Not Taken[1] | Squash instructions skipped by first branch, fetch sequential (L0) |
| Forward Large | Taken | x | x | Squash all instructions after first branch, Fetch target (L0) |
| 32 bit relative or Indirect | Taken | x | x | Squash all instructions after first branch, Fetch target (L1) |
| Return | x | x | x | Squash all instructions after first branch, Fetch target (L0) |
| x | Not Taken | Backward | Taken[1] | Squash all instructions after second branch, Fetch target (L0) |
| x | Not Taken | Forward Small | Taken[1] | Squash instructions skipped by second branch, fetch 2nd Tgt (L0) |
| x | Not Taken | Other | Taken[1] | Squash instructions skipped by second branch, fetch 2nd Tgt (L1) |
| x | Not Taken | x | Not Taken[1] | fetch sequential (L0) |

Note 1: Second Prediction may not be available in one clock cycle, so these results may be delayed by a clock cycle. May assume not taken in first clock cycle, and squash in second clock cycle with corrected fetch.

PROCESSOR CONFIGURED TO SELECT A NEXT FETCH ADDRESS BY PARTIALLY DECODING A BYTE OF A CONTROL TRANSFER INSTRUCTION

This Application claims benefit of priority to the Provisional Application Ser. No. 60/065,878, entitled "High Frequency, Wide Issue Microprocessor" filed on Nov. 17, 1997 by Witt. The Provisional Application is incorporated herein by reference in its entirety.

BACKGROUND OF THE INVENTION

1. Field of the Invention

This invention is related to the field of processors and, more particularly, to fetch address generation techniques within processors.

2. Description of the Related Art

Superscalar processors attempt to achieve high performance by dispatching and executing multiple instructions per clock cycle, and by operating at the shortest possible clock cycle time consistent with the design. To the extent that a given processor is successful at dispatching and/or executing multiple instructions per clock cycle, high performance may be realized. In order to increase the average number of instructions dispatched per clock cycle, processor designers have been designing superscalar processors which employ wider issue rates. A "wide issue" superscalar processor is capable of dispatching (or issuing) a larger maximum number of instructions per clock cycle than a "narrow issue" superscalar processor is capable of dispatching. During clock cycles in which a number of dispatchable instructions is greater than the narrow issue processor can handle, the wide issue processor may dispatch more instructions, thereby achieving a greater average number of instructions dispatched per clock cycle.

Many processors are designed to execute the x86 instruction set due to its widespread acceptance in the computer industry. For example, the K5 and K6 processors from Advanced Micro Devices, Inc., of Sunnyvale, Calif. implement the x86 instruction set. The x86 instruction set is a variable length instruction set in which various instructions occupy differing numbers of bytes in memory. The type of instruction, as well as the addressing modes selected for a particular instruction encoding, may affect the number of bytes occupied by that particular instruction encoding. Variable length instruction sets, such as the x86 instruction set, minimize the amount of memory needed to store a particular program by only occupying the number of bytes needed for each instruction. In contrast, many RISC architectures employ fixed length instruction sets in which each instruction occupies a fixed, predetermined number of bytes.

Unfortunately, variable length instruction sets complicate the design of wide issue processors. For a wide issue processor to be effective, the processor must be able to identify large numbers of instructions concurrently and rapidly within a code sequence in order to provide sufficient instructions to the instruction dispatch hardware. Because the location of each variable length instruction within a code sequence is dependent upon the preceding instructions, rapid identification of instructions is difficult. If a sufficient number of instructions cannot be identified, the wide issue structure may not result in significant performance gains. Therefore, a processor which provides rapid and concurrent identification of instructions for dispatch is needed.

Another feature which is important to the performance achievable by wide issue superscalar processors is the accuracy and effectiveness of its branch prediction mechanism. As used herein, the branch prediction mechanism refers to the hardware which detects control transfer instructions within the instructions being identified for dispatch and which predicts the next fetch address resulting from the execution of the identified control transfer instructions. Generally, a "control transfer" instruction is an instruction which, when executed, specifies the address from which the next instruction to be executed is fetched. Jump instructions are an example of control transfer instructions. A jump instruction specifies a target address different than the address of the byte immediately following the jump instruction (the "sequential address"). Unconditional jump instructions always cause the next instruction to be fetched to be the instruction at the target address, while conditional jump instructions cause the next instruction be fetched to be either the instruction at the target address or the instruction at the sequential address responsive to an execution result of a previous instruction (for example, by specifying a condition flag set via instruction execution). Other types of instructions besides jump instructions may also be control transfer instructions. For example, subroutine call and return instructions may cause stack manipulations in addition to specifying the next fetch address. Many of these additional types of control transfer instructions include a jump operation (either conditional or unconditional) as well as additional instruction operations.

Control transfer instructions may specify the target address in a variety of ways. "Relative" control transfer instructions include a value (either directly or indirectly) which is to be added to an address corresponding to the relative control transfer instruction in order to generate the target address. The address to which the value is added depends upon the instruction set definition. For x86 control transfer instructions, the address of the byte immediately following the control transfer instruction is the address to which the value is added. Other instruction sets may specifying adding the value to the address of the control transfer instruction itself. For relative control transfer instructions which directly specify the value to be added, an instruction field is included for storing the value and the value is referred to as a "displacement".

On the other hand, "absolute" control transfer instructions specify the target address itself (again, either directly or indirectly). Absolute control transfer instructions therefore do not require an address corresponding to the control transfer instruction to determine the target address. Control transfer instructions which specify the target address indirectly (e.g. via one or more register or memory operands) are referred to as "indirect" control transfer instructions.

Because of the variety of available control transfer instructions, the branch prediction mechanism may be quite complex. However, because control transfer instructions occur frequently in many program sequences, wide issue processors have a need for a highly effective (e.g. both accurate and rapid) branch prediction mechanism. If the branch prediction mechanism is not highly accurate, the wide issue processor may issue a large number of instructions per clock cycle but may ultimately cancel many of the issued instructions due to branch mispredictions. On the other hand, the number of clock cycles used by the branch prediction mechanism to generate a target address needs to be minimized to allow for the instructions that the target address to be fetched.

The term "branch instruction" is used herein to be synonymous with "control transfer instruction".

SUMMARY OF THE INVENTION

The problems outlined above are in large part solved by a processor in accordance with the present invention. The processor employs predecoding to identify instruction boundaries as well as to identify which instructions are branch instructions. In one embodiment, the processor stores a start bit corresponding to each instruction byte in the instruction cache with the instruction bytes. The start bit identifies which instruction bytes are the start of an instruction. Additionally, the processor stores a control transfer bit corresponding to each instruction byte. The control transfer bit corresponding to each instruction byte identified as the start of an instruction is used to indicate whether or not the instruction is a branch instruction. Additionally, the byte identified as the start of the branch instruction via the start bit and control transfer bit is partially decoded upon fetch of the branch instruction from the instruction cache to rapidly select the branch target address corresponding to the branch instruction from one of several possible target addresses. The start and control transfer bits allow for the initial byte of the branch instruction to be rapidly located, and by only partially decoding the byte, relatively few logic levels may be employed to generate a target address selection. Advantageously, the amount of time elapsing between fetching a branch instruction and selecting the corresponding target address may be reduced. Instructions stored at the target address may be more rapidly fetched then might otherwise be achievable. The superscalar processor may support wider issue rates by more rapidly fetching instructions.

In one embodiment, partially decoding the initial byte of a branch instruction (as identified by the corresponding start and control transfer bits) allows for selection of the target address from three sources: a relative target address encoded into a byte succeeding the initial byte within a cache line, a return address from a return stack, and a sequential address. In one particular embodiment, the four most significant bits of the initial byte of the branch instruction are decoded to select one of the three source targets.

Broadly speaking, the present invention contemplates a processor comprising a branch scanner and a prefetch control unit. The branch scanner is configured to scan predecode information corresponding to a plurality of instruction bytes fetched by the processor for execution. The predecode information includes a boundary indication corresponding to each of the plurality of instruction bytes and a control transfer indication corresponding to each of the plurality of instruction bytes. The branch scanner is configured to select a particular instruction byte from the plurality of instruction bytes, the particular instruction byte having a corresponding boundary indication indicating that the particular instruction byte is a boundary of an instruction and a corresponding control transfer indication indicating that the instruction is a control transfer instruction. Coupled to the predecode unit, the prefetch control unit is configured to select a next fetch address from a plurality of addresses. The prefetch control unit is configured to receive the particular instruction byte and to decode a portion of the particular instruction byte and to exclude a remaining portion of the particular instruction byte. In response thereto, the prefetch control unit is configured to select the next fetch address.

The present invention further contemplates a method for selecting a next fetch address in a processor. An instruction byte is selected from a plurality of instruction bytes previously fetched by the processor. The instruction byte is selected by scanning predecode information corresponding to the plurality of instruction bytes. The predecode information identifies the as a boundary of a control transfer instruction. A portion of the instruction byte is decoded to the exclusion of a remaining portion thereof. Responsive to the decoding, one of a plurality of source addresses is selected as the next fetch address.

Moreover, the present invention contemplates a computer system comprising a processor, a memory, and an input/output (I/O) device. The processor includes a branch scanner and a prefetch control unit. The branch scanner is configured to scan predecode information corresponding to a plurality of instruction bytes fetched by the processor for execution. The predecode information includes a boundary indication corresponding to each of the plurality of instruction bytes and a control transfer indication corresponding to each of the plurality of instruction bytes. The branch scanner is configured to select a particular instruction byte from the plurality of instruction bytes. The particular instruction byte has a corresponding boundary indication indicating that the particular instruction byte is a boundary of an instruction and a corresponding control transfer indication indicating that the instruction is a control transfer instruction. Coupled to the predecode unit, the prefetch control unit is configured to select a next fetch address from a plurality of addresses. The prefetch control unit is configured to receive the particular instruction byte and to decode a portion of the particular instruction byte and to exclude a remaining portion of the particular instruction byte, and to select the next fetch address in response thereto. Coupled to the processor, the memory is configured to store the plurality of instruction bytes and to provide the plurality of instruction bytes to the processor. The I/O device is configured to transfer data between the computer system and another computer system coupled to the I/O device.

BRIEF DESCRIPTION OF THE DRAWINGS

Other objects and advantages of the invention will become apparent upon reading the following detailed description and upon reference to the accompanying drawings in which:

FIG. 12 is a table illustrating instruction fetch and dispatch results for one embodiment of the processor shown in FIG. 1 in which up to two branch instructions are predicted per clock cycle.

Figure 1:
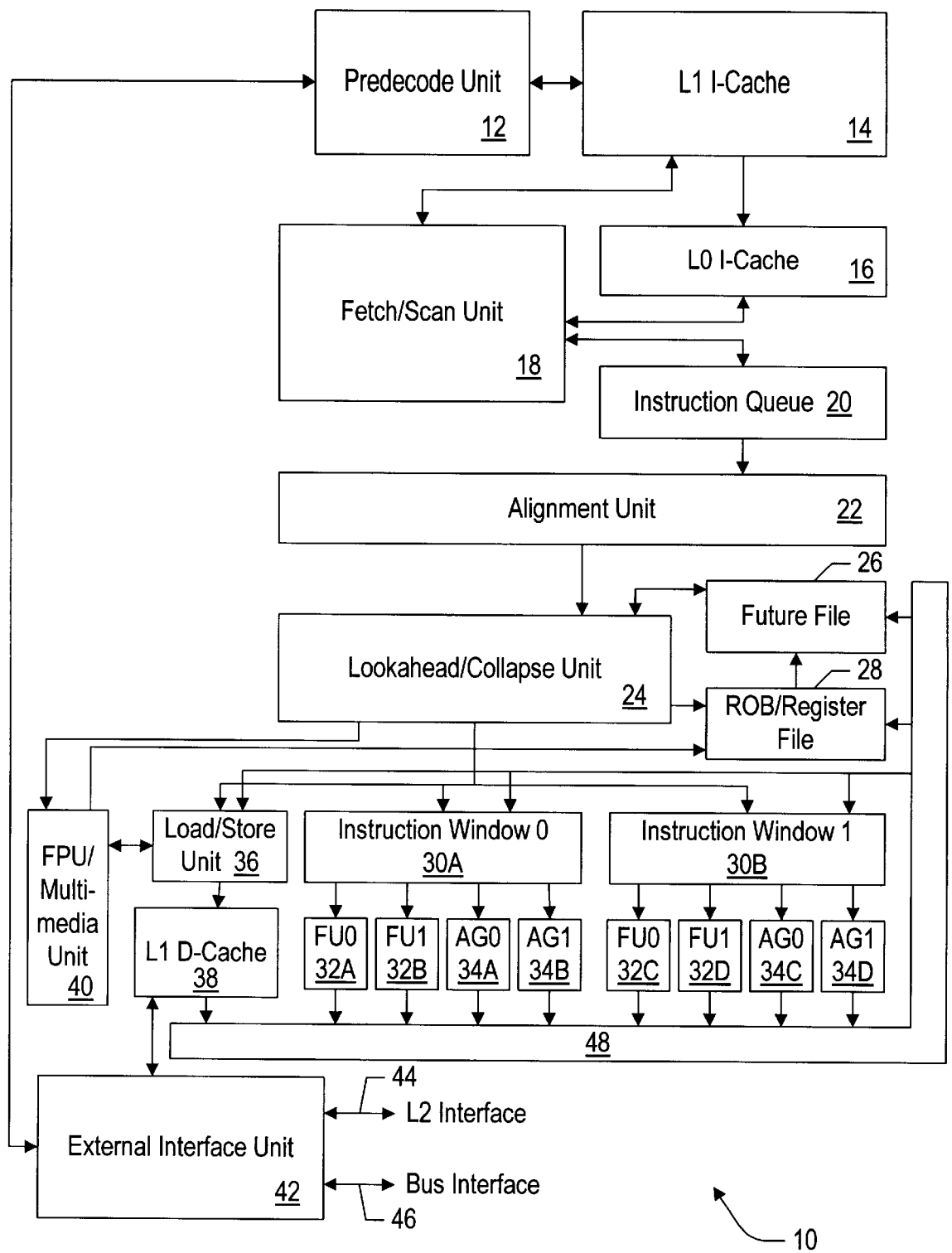
FIG. 1 is a block diagram of one embodiment of a superscalar processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a lookahead/collapse unit 24, a future file 26, a reorder buffer/register file 28, a first instruction window 30A, a second instruction window 30B, a plurality of functional units 32A, 32B, 32C, and 32D, a plurality of address generation units 34A, 34B, 34C, and 34D, a load/store unit 36, an L1 D-cache 38, an FPU/multimedia unit 40, and an external interface unit 42. Elements referred to herein by a particular reference number followed by various letters will be collectively referred to using the reference number alone. For example, functional units 32A, 32B, 32C, and 32D will be collectively referred to as functional units 32.

In the embodiment of FIG. 1, external interface unit 42 is coupled to predecode unit 12, L1 D-cache 38, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is further coupled to lookahead/collapse unit 24. Lookahead/collapse unit 24 is further coupled to future file 26, reorder buffer/register file 28, load/store unit 36, first instruction window 30A, second instruction window 30B, and FPU/multimedia unit 40. FPU/multimedia unit 40 is coupled to load/store unit 36 and to reorder buffer/register file 28. Load/store unit 36 is coupled to L1 D-cache 38. First instruction window 30A is coupled to functional units 32A–32B and to address generation units 34A–34B. Similarly, second instruction window 30B is coupled to functional units 32C–32D and address generation units 34C–34D. Each of L1 D-cache 38, functional units 32, and address generation units 34 are coupled to a plurality of result buses 48 which are further coupled to load/store unit 36, first instruction window 30A, second instruction window 30B, reorder buffer/register file 28, and future file 26.

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction. A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses which the bytes within a second cache line are stored. A signed eight bit displacement specifies an address which is +/−128 bytes of the address corresponding to the branch instruction. Accordingly, the number of above and below cache lines which can be reached by a relative branch instruction having an eight bit displacement is limited. The relative cache line portion encodes this limited set of above and below cache lines.

Tables 1 and 2 below illustrates an exemplary encoding of the predecode information corresponding to a byte in accordance with one embodiment of processor 10.

TABLE 2

Target Address Encoding

| Control Transfer Bit | Displacement Byte Most Significant Bits (binary) | Meaning |
|---|---|---|
| 0 | 00 | Within Current Cache Line |
| 0 | 01 | One Cache Line Above |
| 0 | 10 | Two Cache Lines Above |
| 1 | 01 | One Cache Line Below |
| 1 | 10 | Two Cache Lines Below |

Note: Remaining displacement byte bits are the offset within the target cache line. Control Transfer Bit is effectively a direction, and the most significant bits of the displacement byte are the number of cache lines.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/ physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. In one embodiment, fetch/scan unit 18 is configured to prefetch the next sequential cache line to a cache line fetched from L0 I-cache 16 during a particular clock cycle unless: (i) a branch misprediction is signalled; (ii) an L0 I-cache miss is detected; or (iii) a target address is generated which is assumed to miss L0 I-cache 16. In one particular embodiment, relative branch instructions employing 32-bit displacements and branch instructions employing indirect target address generation are assumed to miss L0 I-cache 16. For case (i), fetch/scan unit 18 prefetches the cache line sequential to the corrected fetch address. For cases (ii) and (iii), fetch/scan unit 18 prefetches the corresponding miss or target address.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries. An exemplary embodiment of instruction queue 20 is illustrated below in FIG. 13.

Alignment unit 22 is configured to route instructions identified by instruction queue 20 to a set of issue positions within lookahead/collapse unit 24. In other words alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Lookahead/collapse unit 24 decodes the instructions provided by alignment unit 22. FPU/multimedia instructions detected by lookahead/collapse unit 24 are routed to FPU/multimedia unit 40. Other instructions are routed to first instruction window 30A, second instruction window 30B, and/or load/store unit 36. In one embodiment, a particular instruction is routed to one of first instruction window 30A or second instruction window 30B based upon the issue position to which the instruction was aligned by alignment unit 22. According to one particular embodiment, instructions from alternate issue positions are routed to alternate instruction windows 30A and 30B. For example, instructions from issue positions zero, two, and four may be routed to the first instruction window 30A and instructions from issue positions one, three, and five may be routed to the second instruction window 30B. Instructions which include a memory operation are also routed to load/store unit 36 for access to L1 D-cache 38.

Additionally, lookahead/collapse unit 24 attempts to generate lookahead addresses or execution results for certain types of instructions. Lookahead address/result generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values.

To accelerate the execution of these instructions, lookahead/collapse unit 24 generates lookahead copies of the ESP and EBP registers for each of the instructions decoded during a clock cycle. Additionally, lookahead/collapse unit 24 accesses future file 26 for register operands selected by each instruction. For each register operand, future file 26 may be storing either an execution result or a tag identifying a reorder buffer result queue entry corresponding to the most recent instruction having that register as a destination operand.

In one embodiment, lookahead/collapse unit 24 attempts to perform an address calculation for each instruction which: (i) includes a memory operand; and (ii) register operands used to form the address of the memory operand are available from future file 26 or lookahead copies of ESP/EBP. Additionally, lookahead/collapse unit 24 attempts to perform a result calculation for each instruction which: (i) does not include a memory operand; (ii) specifies an add/subtract operation (including increment and decrement); and (iii) register operands are available from future file 26 or lookahead copies of ESP/EBP. In this manner, many simple operations may be completed prior to instructions being sent to instruction windows 30A–30B.

Lookahead/collapse unit 24 detects dependencies between a group of instructions being dispatched and collapses any execution results generated therein into instructions dependent upon those instruction results. Additionally, lookahead/collapse unit 24 updates future file 26 with the lookahead execution results. Instruction operations which are completed by lookahead/collapse unit 24 (i.e. address generations and/or instruction results are generated and load/store unit 36 or future file 26 and the result queue are updated) are not dispatched to instruction windows 30A–30B.

Lookahead/collapse unit 24 allocates a result queue entry in reorder buffer/register file 28 for each instruction dispatched. In one particular embodiment, reorder buffer/register file 28 includes a result queue organized in a line-oriented fashion in which storage locations for execution results are allocated and deallocated in lines having enough storage for execution results corresponding to a maximum number of concurrently dispatchable instructions. If less than the maximum number of instructions are dispatched, then certain storage locations within the line are empty. Subsequently dispatched instructions use the next available line, leaving the certain storage locations empty. In one embodiment, the result queue includes 40 lines, each of which may store up to six execution results corresponding to concurrently dispatched instructions.

Figure 14:
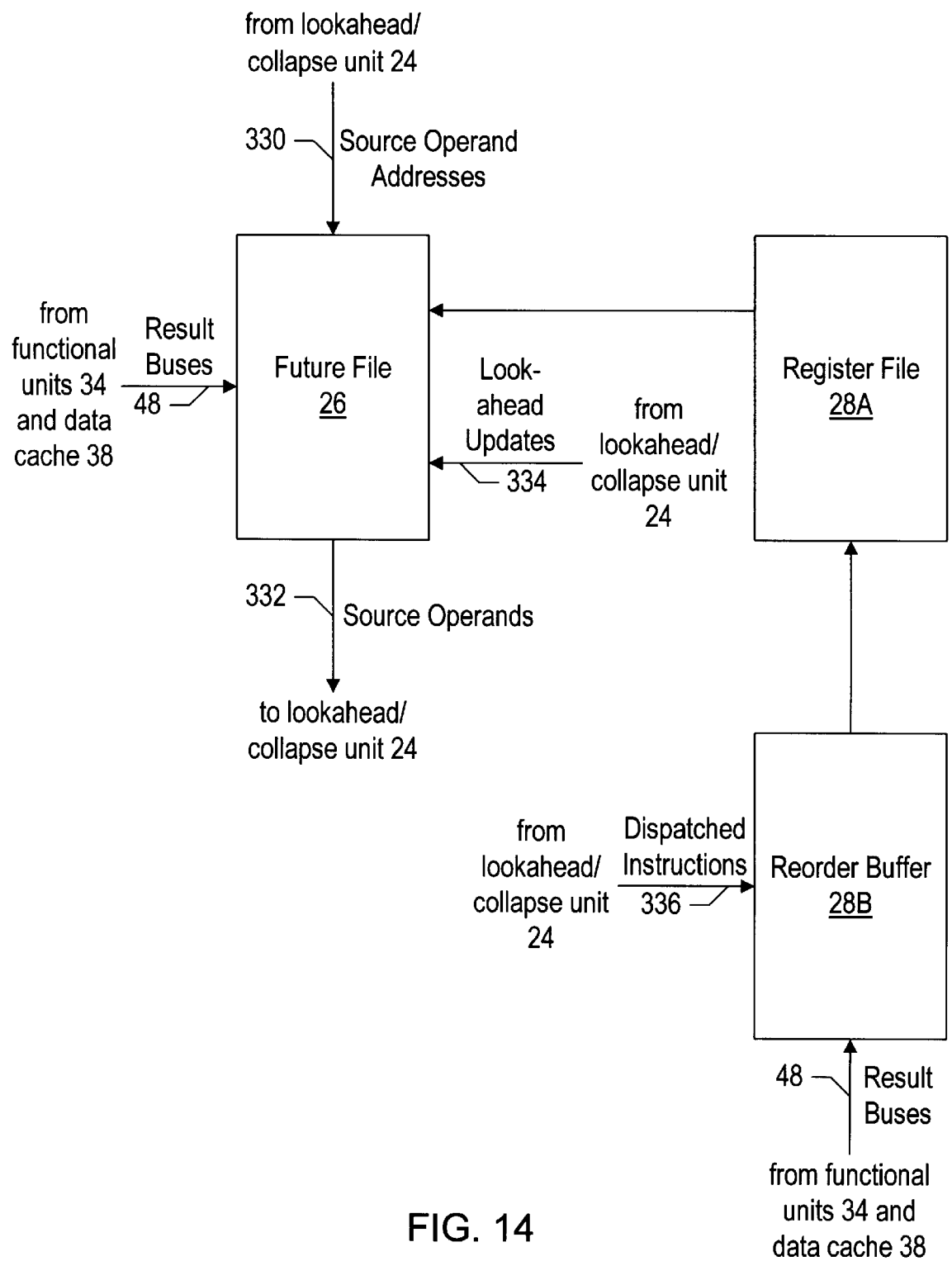
FIG. 14 is a block diagram of one embodiment of a future file, register file, and reorder buffer shown in FIG. 1.

Execution results are retired from the result queue in order into the register file included within reorder buffer/register file 28. Additionally, the reorder buffer handles branch mispredictions, transmitting the corrected fetch address generated by the execution of the branch instruction to fetch/scan unit 18. Similarly, instructions which generate other exceptions are handled within the reorder buffer. Results corresponding to instructions subsequent to the exception-generating instruction are discarded by the reorder buffer. The register file comprises a storage location for each architected register. For example, the x86 instruction set defines 8 architected registers. The register file for such an embodiment includes eight storage locations. The register file may further include storage locations used as temporary registers by a microcode unit in embodiments employing microcode units. Further details of one exemplary embodiment of future file 26 and reorder buffer/register file 28 are illustrated in FIG. 14 below.

Future file 26 maintains the speculative state of each architected register as instructions are dispatched by lookahead/collapse unit 24. As an instruction having a register destination operand is decoded by lookahead/collapse unit 24, the tag identifying the storage location within the result queue portion of reorder buffer/register file 28 assigned to the instruction is stored into the future file 26 storage location corresponding to that register. When the corresponding execution result is provided, the execution result is stored into the corresponding storage location (assuming that a subsequent instruction which updates the register has not been dispatched).

It is noted that, in one embodiment, a group of up to six instructions is selected from instruction queue 20 and moves through the pipeline within lookahead/collapse unit 24 as a unit. If one or more instructions within the group generates a stall condition, the entire group stalls. An exception to this rule is if lookahead/collapse unit 24 generates a split line condition due to the number of ESP updates within the group). Such a group of instructions is referred to as a "line" of instructions herein.

Instruction windows 30 receive instructions from lookahead/collapse unit 24. Instruction windows 30 store the instructions until the operands corresponding to the instructions are received, and then select the instructions for execution. Once the address operands of an instruction including a memory operation have been received, the instruction is transmitted to one of the address generation units 34. Address generation units 34 generate an address from the address operands and forward the address to load/store unit 36. On the other hand, once the execution operands of an instruction have been received, the instruction is transmitted to one of the functional units 32 for execution. In one embodiment, each integer window 30A–30B includes 25 storage locations for instructions. Each integer window 30A–30B is configured to select up to two address generations and two functional unit operations for execution each clock cycle in the address generation units 34 and functional units 32 connected thereto. In one embodiment, instructions fetched from L0 I-cache 16 remain in the order fetched until stored into one of instruction windows 30, at which point the instructions may be executed out of order.

In embodiments of processor 10 employing the x86 instruction set, an instruction may include implicit memory operations for load/store unit 36 as well as explicit functional operations for functional units 32. Instructions having no memory operand do not include any memory operations, and are handled by functional units 32. Instructions having a source memory operand and a register destination operand include an implicit load memory operation handled by load/store unit 36 and an explicit functional operation handled by functional units 32. Instructions having a memory source/destination operand include implicit load and store memory operations handled by load/store unit 36 and an explicit functional operation handled by functional units 32. Finally, instructions which do not have an explicit functional operation are handled by load/store unit 36. Each memory operation results in an address generation handled either by lookahead/collapse unit 24 or address generation units 34. Memory operations and instructions (i.e. functional operations) may be referred to herein separately, but may be sourced from a single instruction.

Address generation units 34 are configured to perform address generation operations, thereby generating addresses for memory operations in load/store unit 36. The generated addresses are forwarded to load/store unit 36 via result buses 48. Functional units 32 are configured to perform integer arithmetic/logical operations and execute branch instructions. Execution results are forwarded to future file 26, reorder buffer/register file 28, and instruction windows 30A–30B via result buses 48. Address generation units 34 and functional units 32 convey the result queue tag assigned to the instruction being executed upon result buses 48 to identify the instruction being executed. In this manner, future file 26, reorder buffer/register file 28, instruction windows 30A–30B, and load/store unit 36 may identify execution results with the corresponding instruction. FPU/multimedia unit 40 is configured to execute floating point and multimedia instructions.

Load/store unit 36 is configured to interface with L1 D-cache 38 to perform memory operations. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory. Load/store unit 36 may receive addresses for memory operations from lookahead/collapse unit 24 (via lookahead address calculation) or from address generation units 34. In one embodiment, load/store unit 36 is configured perform up to three memory operations per clock cycle to L1 D-cache 38. For this embodiment, load/store unit 36 may be configured to buffer up to 30 load/store memory operations which have not yet accessed D-cache 38. The embodiment may further be configured to include a 96 entry miss buffer for buffering load memory operations which miss D-cache 38 and a 32 entry store data buffer. Load/store unit 36 is configured to perform memory dependency checking between load and store memory operations.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified to processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
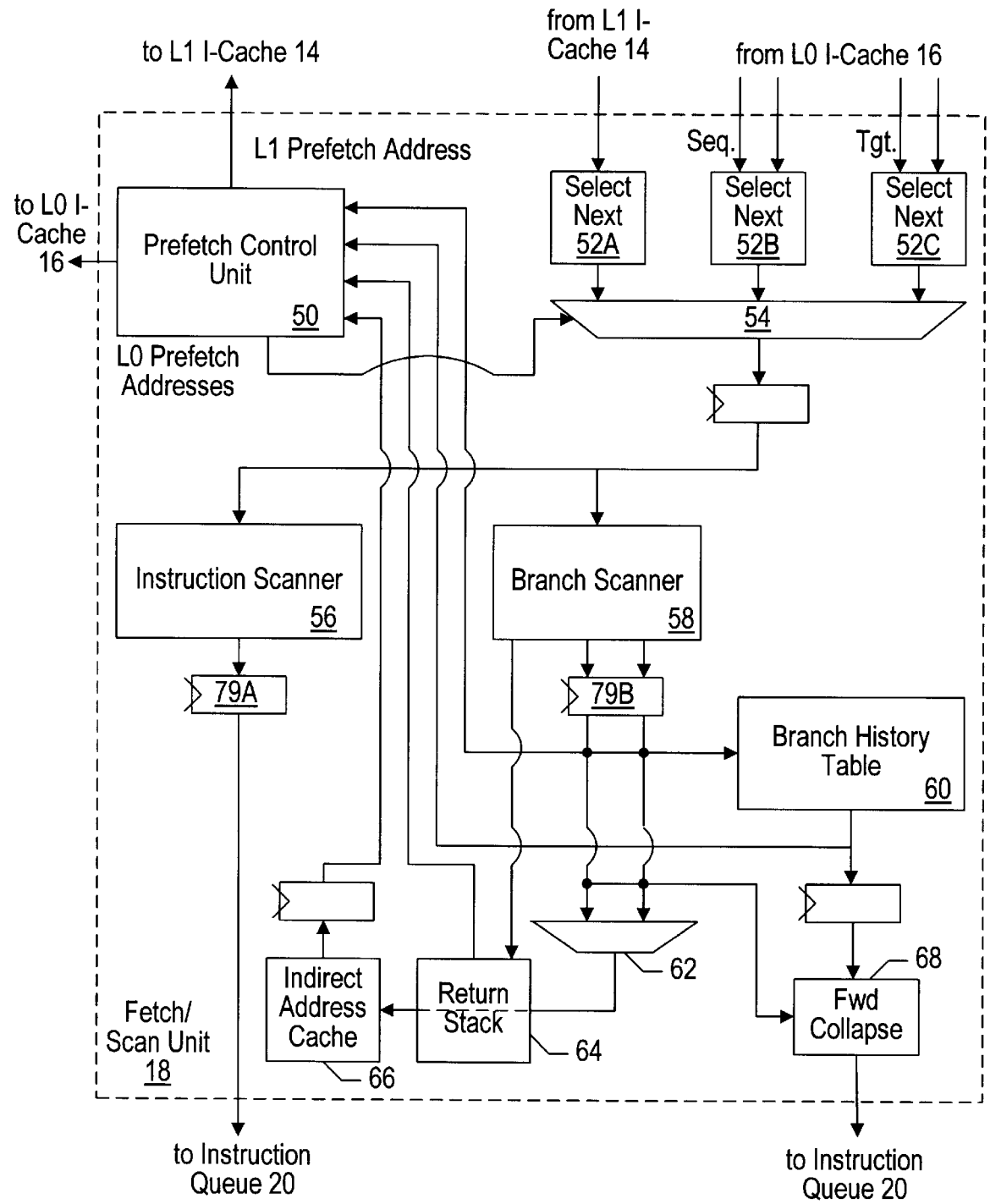
FIG. 2 is a block diagram of one embodiment of a fetch/scan unit shown in FIG. 1.

Turning now to FIG. 2, a block diagram of one embodiment of fetch/scan unit 18 is shown. Other embodiments are possible and contemplated. As shown in FIG. 2, fetch/scan unit 18 includes a prefetch control unit 50, a plurality of select next blocks 52A–52C, an instruction select multiplexor (mux) 54, an instruction scanner 56, a branch scanner 58, a branch history table 60, a branch select mux 62, a return stack 64, an indirect address cache 66, and a forward collapse unit 68. Prefetch control unit 50 is coupled to L1 I-cache 14, L0 I-cache 16, indirect address cache 66, return stack 64, branch history table 60, branch scanner 58, and instruction select mux 54. Select next block 52A is coupled to L1 I-cache 14, while select next blocks 52B–52C are coupled to L0 I-cache 16. Each select next block 52 is coupled to instruction select mux 54, which is further coupled to branch scanner 58 and instruction scanner 56. Instruction scanner 56 is coupled to instruction queue 20.

Branch scanner 58 is coupled to branch history table 60, return stack 64, and branch select mux 62. Branch select mux 62 is coupled to indirect address cache 66. Branch history table 60 and branch scanner 58 are coupled to forward collapse unit 68, which is coupled to instruction queue 20.

Prefetch control unit 50 receives branch prediction information (including target addresses and taken/not taken predictions) from branch scanner 58, branch history table 60, return stack 64, and indirect address cache 66. Responsive to the branch prediction information, prefetch control unit 50 generates fetch addresses for L0 I-cache 16 and a prefetch address for L1 I-cache 14. In one embodiment, prefetch control unit 50 generates two fetch addresses for L0 I-cache 16. The first fetch address is selected as the target address corresponding to the first branch instruction identified by branch scanner 58 (if any). The second fetch address is the sequential address to the fetch address selected in the previous clock cycle (i.e. the fetch address corresponding to the run selected by instruction select mux 54).

L0 I-cache 14 provides the cache lines (and predecode information) corresponding to the two fetch addresses, as well as the cache lines (and predecode information) which are sequential to each of those cache lines, to select next blocks 52B–52C. More particularly, select next block 52B receives the sequential cache line corresponding to the sequential address and the next incremental cache line to the sequential cache line. Select next block 52C receives the target cache line corresponding to the target address as well as the cache line sequential to the target cache line. Additionally, select next blocks 52B–52C receive the offset portion of the corresponding fetch address. Select next blocks 52B–52C each select a run of instruction bytes (and corresponding predecode information) from the received cache lines, beginning with the run section including the offset portion of the corresponding fetch address. Since the offset portion of each fetch address can begin anywhere within the cache line, the selected run may included portions of the fetched cache line and the sequential cache line to the fetched cache line. Hence, both the fetched cache line and the sequential cache line are received by select next blocks 52B–52C.

Similarly, select next block 52A receives a prefetched cache line (and corresponding predecode information) from L1 I-cache 14 and selects an instruction run therefrom. Since one cache line is prefetched from L1 I-cache 14, the run selected therefrom may comprise less than a full run if the offset portion of the prefetch address is near the end of the cache line. It is noted that the fetch cache lines from L0 I-cache 16 may be provided in the same clock cycle as the corresponding addresses are generated by prefetch control unit 50, but the prefetch cache line may be a clock cycle delayed due to the larger size and slower access time of L1 I-cache 14. In addition to providing the prefetched cache line to select next block 52A, L1 I-cache 14 provides the prefetched cache line to L0 I-cache 16. If the prefetched cache line is already stored within L0 I-cache 16, L0 I-cache 16 may discard the prefetched cache line. However, if the prefetched cache line is not already stored in L0 I-cache 14, the prefetched cache line is stored into L0 I-cache 16. In this manner, cache lines which may be accessed presently are brought into L0 I-cache 16 for rapid access therefrom. According to one exemplary embodiment, L0 I-cache 16 comprises a fully associative cache structure of eight entries. A fully associative structure may be employed due to the relatively small number of cache lines included in L0 I-cache 16. Other embodiments may employ other organizations (e.g. set associative or direct-mapped).

Prefetch control unit 50 selects the instruction run provided by one of select next blocks 52 in response to branch prediction information by controlling instruction select mux 54. As will be explained in more detail below, prefetch control unit 50 receives target addresses from branch scanner 58, return stack 64, and indirect address cache 66 early in the clock cycle as well as at least a portion of the opcode byte of the first branch instruction identified by branch scanner 58. Prefetch control unit 50 decodes the portion of the opcode byte to select the target address to be fetched from L0 I-cache 16 from the various target address sources and provides the selected target address to L0 I-cache 16. In parallel, the sequential address to the fetch address selected in the previous clock cycle (either the target address or the sequential address from the previous clock cycle, depending upon the branch prediction from the previous clock cycle) is calculated and provided to L0 I-cache 16. Branch prediction information (i.e. taken or not taken) is provided by branch history table 60 late in the clock cycle. If the branch instruction corresponding to the target address fetched from L0 I-cache 16 is predicted taken, then prefetch control unit 50 selects the instruction run provided by select next block 52C. On the other hand, if the branch instruction is predicted not taken, then the instruction run selected by select next block 52B is selected. The instruction run provided by select next block 52A is selected if a predicted fetch address missed L0 I-cache 16 in a previous clock cycle and was fetched from L1 I-cache 14. Additionally, the instruction run from L1 I-cache 14 is selected if the instruction run was prefetched responsive to a branch instruction have a 32 bit displacement or indirect target address generation or an L0 I-cache miss was fetched.

The selected instruction run is provided to instruction scanner 56 and branch scanner 58. Instruction scanner 56 scans the predecode information corresponding to the selected instruction run to identify instructions within the instruction run. More particularly in one embodiment, instruction scanner 56 scans the start bits corresponding to each run section in parallel and identifies up to five instructions within each run section. Pointers to the identified instructions (offsets within the run section) are generated. The pointers, instruction bytes, and addresses (one per run section) are conveyed by instruction scanner 56 to instruction queue 20. If a particular run section includes more than five instructions, the information corresponding to run sections subsequent to the particular run section is invalidated and the particular run section and subsequent run sections are rescanned during the next clock cycle.

Branch scanner 58 scans the instruction run in parallel with instruction scanner 56. Branch scanner 58 scans the start bits and control transfer bits of the instruction run to identify the first two branch instructions within the instruction run. As described above, a branch instruction is identified by the control transfer bit corresponding to the start byte of an instruction (as identified by the start bit) being set. Upon locating the first two branch instructions, branch scanner 58 assumes that the instructions are relative branch instructions and selects the corresponding encoded target addresses from the instruction bytes following the start byte of the branch instruction. For embodiments employing the x86 instruction set, a nine bit target address (the displacement byte as well as the corresponding control transfer bit) is selected, and a 32 bit target address is selected as well. Furthermore, at least a portion of the opcode byte identified by the start and control transfer bits is selected. The target addresses and opcode bytes are routed to prefetch control unit 50 for use in selecting a target address for fetching from L0 I-cache 16. The fetch addresses of each branch instruction (determined from the fetch address of the run section including each branch instruction and the position of the branch instruction within the section) are routed to branch history table 60 for selecting a taken/not-taken prediction corresponding to each branch instruction. Furthermore, the fetch addresses corresponding to each branch instruction are routed to branch select mux 62, which is further routed to indirect address cache 66. The target address of each branch instruction is routed to forward collapse unit 68. According to one embodiment, branch scanner 58 is configured to scan each run section in parallel for the first two branch instructions and then to combine the scan results to select the first two branch instructions within the run.

Branch scanner 58 may further be configured to determine if a subroutine call instruction is scanned during a clock cycle. Branch scanner 58 may forward the fetch address of the next instruction following the detected subroutine call instruction to return stack 64 for storage therein.

In one embodiment, if there are more than two branch instructions within a run, the run is scanned again during a subsequent clock cycle to identify the subsequent branch instruction.

The fetch addresses of the identified branch instructions are provided to branch history table 60 to determine a taken/not taken prediction for each instruction. Branch history table 60 comprises a plurality of taken/not-taken predictors corresponding to the previously detected behavior of branch instructions. One of the predictors is selected by maintaining a history of the most recent predictions and exclusive ORing those most recent predictions with a portion of the fetch addresses corresponding to the branch instructions. The least recent (oldest) prediction is exclusive ORed with the most significant bit within the portion of the fetch address, and so forth through the most recent prediction being exclusive ORed with the least significant bit within the portion of the fetch address. Since two predictors are selected per clock cycle, the predictor corresponding to the second branch instruction is dependent upon the prediction of the first branch instruction (for exclusive ORing with the least significant bit of the corresponding fetch address). Branch history table 60 provides the second predictor by selecting both of the predictors which might be selected (i.e. the predictor that would be selected if the first branch instruction is predicted not-taken and the predictor that would be selected if the first branch instruction is predicted taken) and then selecting one of the two predictors based on the actual prediction selected for the first branch instruction.

Branch history table 60 receives information regarding the execution of branch instructions from functional units 32A–32D. The history of recent predictions corresponding to the executed branch instruction as well as the fetch address of the executed branch instruction are provided for selecting a predictor to update, as well as the taken/not taken result of the executed branch instruction. Branch history table 60 selects the corresponding predictor and updates the predictor based on the taken/not taken result. In one embodiment, the branch history table stores a bimodal counter. The bimodal counter is a saturating counter which saturates at a minimum and maximum value (i.e. subsequent decrements of the minimum value and increments of the maximum value cause no change in the counter). Each time a branch instruction is taken, the corresponding counter is incremented and each time a branch instruction is not taken, the corresponding counter is decremented. The most significant bit of the counter indicates the taken/not taken prediction (e.g. taken if set, not taken if clear). In one embodiment, branch history table 60 stores 64K predictors and maintains a history of the 16 most recent predictions. Each clock cycle, the predictions selected during the clock cycle are shifted into the history and the oldest predictions are shifted out of the history.

Return stack 64 is used to store the return addresses corresponding to detected subroutine call instructions. Return stack 64 receives the fetch address of a subroutine call instruction from branch scanner 58. The address of the byte following the call instruction (calculated from the fetch address provided to return stack 64) is placed at the top of return stack 64. Return stack 64 provides the address stored at the top of the return stack to prefetch control unit 50 for selection as a target address if a return instruction is detected by branch scanner 58 and prefetch control unit 50. In this manner, each return instruction receives as a target address the address corresponding to the most recently detected call instruction. Generally in the x86 instruction set, a call instruction is a control transfer instruction which specifies that the sequential address to the call instruction be placed on the stack defined by the x86 architecture. A return instruction is an instruction which selects the target address from the top of the stack. Generally, call and return instructions are used to enter and exit subroutines within a code sequence (respectively). By placing addresses corresponding to call instructions in return stack 64 and using the address at the top of return stack 64 as the target address of return instructions, the target address of the return instruction may be correctly predicted. In one embodiment, return stack 64 may comprise 16 entries.

Indirect address cache 66 stores target addresses corresponding to previous executions of indirect branch instructions. The fetch address corresponding to an indirect branch instruction and the target address corresponding to execution of the indirect branch instruction are provided by functional units 32A–32D to indirect address cache 66. Indirect address cache 66 stores the target addresses indexed by the corresponding fetch addresses. Indirect address cache 66 receives the fetch address selected by branch select mux 62 (responsive to detection of an indirect branch instruction) and, if the fetch address is a hit in indirect address cache 66, provides the corresponding target address to prefetch control unit 50. In one embodiment, indirect address cache 66 may comprise 32 entries.

According to one contemplated embodiment, if indirect address cache 66 detects a miss for a fetch address, indirect address cache 66 may be configured to select a target address to provide from one of the entries. In this manner, a "guess" at a branch target is provided in case an indirect branch instruction is decoded. Fetching from the guess may be performed rather than awaiting the address via execution of the indirect branch instruction. Alternatively, another contemplated embodiment awaits the address provided via execution of the indirect branch instruction.

According to one embodiment, prefetch control unit 50 selects the target address for fetching from L0 I-cache 16 from: (i) the first encoded target address corresponding to the first branch instruction identified by branch scanner 58; (ii) the return stack address provided by return stack 64; and (iii) a sequential address. Prefetch control unit 50 selects the first encoded target address if a decode of the opcode corresponding to the first instruction indicates that the instruction may be a relative branch instruction. If the decode indicates that the instruction may be a return instruction, then the return stack address is selected. Otherwise, the sequential address is selected. Indirect target addresses and 32 bit relative target addresses are prefetched from L1 I-cache 14. Since these types of target addresses are often used when the target address is not near the branch instruction within memory, these types of target addresses are less likely to hit in L0 I-cache 16. Additionally, if the second branch instruction is predicted taken and the first branch instruction is predicted not taken or the first branch instruction is a forward branch which does not eliminate the second branch instruction in the instruction run, the second target address corresponding to the second branch prediction may be used as the target fetch address during the succeeding clock cycle according to one embodiment.

It is noted that, if an encoded target address is selected, the actual target address may be presented to L0 I-cache 16. Prefetch control unit 50 may be configured to precalculate each of the possible above/below target addresses and select the correct address based on the encoded target address. Alternatively, prefetch control unit 50 may record which L0 I-cache storage locations are storing the above and below cache lines, and select the storage locations directly without a tag compare.

Forward collapse unit 68 receives the target addresses and positions within the instruction run of each selected branch instruction as well as the taken/not taken predictions. Forward collapse unit 68 determines which instructions within the run should be cancelled based upon the received predictions. If the first branch instruction is predicted taken and is backward (i.e. the displacement is negative), all instructions subsequent to the first branch instruction are cancelled. If the first branch instruction is predicted taken and is forward but the displacement is small (e.g. within the instruction run), the instructions which are between the first branch instruction and the target address are cancelled. The second branch instruction, if still within the run according to the first branch instruction's prediction, is treated similarly. Cancel indications for the instructions within the run are set to instruction queue 20.

Prefetch control unit 50 may be further configured to select a cache line within L0 I-cache 16 for replacement by a cache line provided from L1 I-cache 14. In one embodiment, prefetch control unit 50 may use a least recently used (LRU) replacement algorithm.

Figure 3:
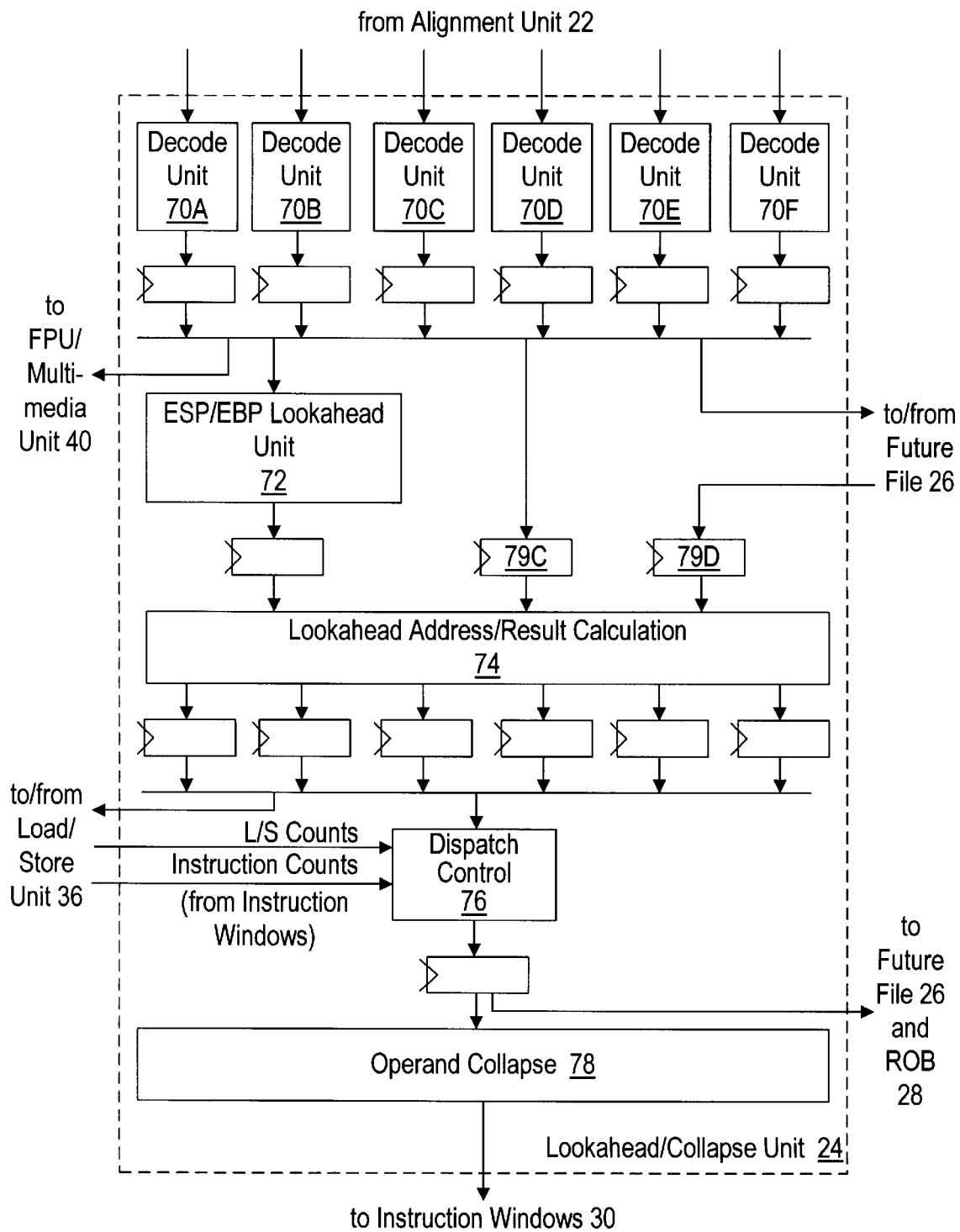
FIG. 3 is a block diagram of one embodiment of a decode and lookahead/collapse unit shown in FIG. 1.

Turning now to FIG. 3, a block diagram of one embodiment of lookahead/collapse unit 24 is shown. Other embodiments are possible and contemplated. As shown in FIG. 3, lookahead/collapse unit 24 includes a plurality of decode units 70A–70F, an ESP/EBP lookahead unit 72, a lookahead address/result calculation unit 74, a dispatch control unit 76, and an operand collapse unit 78. Decode units 70A–70F are coupled to receive instructions from alignment unit 22. Decode units 70A–70F are coupled to provide decoded instructions to FPU/multimedia unit 40, ESP/EBP lookahead unit 72, future file 26, and lookahead address/result calculation unit 74. ESP/EBP lookahead unit 72 is coupled to lookahead address/result calculation unit 74, as is future file 26. Lookahead address/result calculation unit 74 is further coupled load/store unit 36 and dispatch control unit 76. Dispatch unit 76 is further coupled to operand collapse unit 78, future file 26, load/store unit 36, and reorder buffer 28. Operand collapse unit 78 is coupled to instruction windows 30.

Each decode unit 70A–70F forms an issue position to which alignment unit 22 aligns an instruction. While not indicated specifically throughout FIG. 3 for simplicity the drawing, a particular instruction remains within its issue position as the instruction moves through lookahead/collapse unit 24 and is routed to one of instruction windows 30A–30B if not completed within lookahead/collapse unit 24.

Decode units 70A–70F route FPU/multimedia instructions to FPU/multimedia unit 40. However, if the FPU/multimedia instructions include memory operands, memory operations are also dispatched to load/store unit 36 in response to the instruction through lookahead address/result calculation unit 74. Additionally, if the address for the memory operations cannot be generated by lookahead address/result calculation unit 74, an address generation operation is dispatch to one of address generation units 34A–34D via instruction windows 30A–30B. Still further, entries within reorder buffer 28 are allocated to the FPU/multimedia instructions for maintenance of program order. Generally, entries within reorder buffer 28 are allocated from decode units 70A–70F for each instruction received therein.

Each of decode units 70A–70F are further configured to determine: (i) whether or not the instruction uses the ESP or EBP registers as a source operand; and (ii) whether not the instruction modifies the ESP/EBP registers (i.e. has the ESP or EBP registers as a destination operand). Indications of these determinations are provided by decode units 70A–70F to ESP/EBP lookahead unit 72. ESP/EBP lookahead unit 72 generates lookahead information for each instruction which uses the ESP or EBP registers as a source operand. The lookahead information may include a constant to be added to the current lookahead value of the corresponding register and an indication of a dependency upon an instruction in a prior issue position. In one embodiment, ESP/EBP lookahead unit 72 is configured to provide lookahead information as long as the set of concurrently decoded instructions provided by decode units 70A–70F do not include more than: (i) two push operations (which decrement the ESP register by a constant value); (ii) two pop operations (which increment ESP register by a constant value); (iii) one move to ESP register; (iv) one arithmetic/logical instruction having the ESP as a destination; or (v) three instructions which update ESP. If one of these restrictions is exceeded, ESP/EBP lookahead unit 72 is configured to stall instructions beyond those which do not exceed restrictions until the succeeding clock cycle (a "split line" case). For those instructions preceded, in the same clock cycle but in earlier issue positions, by instructions which increment or decrement the ESP register, ESP/EBP lookahead unit 72 generates a constant indicating the combined total modification to the ESP register of the preceding instructions. For those instructions preceded by a move or arithmetic operation upon the ESP or EBP registers, ESP/EBP lookahead unit 72 generates a value identifying the issue position containing the move or arithmetic instruction.

The lookahead values may be used by lookahead address/result calculation unit 74 to generate either a lookahead address corresponding to the instruction within the issue position (thereby inhibiting an address generation operation which would otherwise be performed by one of address generation units 34A–34D) or a lookahead result corresponding to the instruction (thereby providing lookahead state to future file 26 earlier in the pipeline). Performance may be increased by removing address generation operations and/or providing lookahead state prior to functional units 32A–32D and address generation units 34A–34D. Many x86 code sequences include a large number of relatively simple operations such as moves of values from a source to destination without arithmetic/logical operation or simple arithmetic operations such as add/subtract by small constant or increment/decrement of a register operand. Accordingly, functional units 32A–32D may typically execute the more complex arithmetic/logical operations and branch instructions and address generation units 34A–34D may typically perform the more complex address generations. Instruction throughput may thereby be increased.

Decode units 70A–70F are still further configured to identify immediate data fields from the instructions decoded therein. The immediate data is routed to lookahead address/result calculation unit 74 by decode units 70A–70F. Additionally, decode unit 70A–70F are configured to identify register operands used by the instructions and to route register operand requests to future file 26. Future file 26 returns corresponding speculative register values or result queue tags for each register operand. Decode units 70 further provide dependency checking between the line of instructions to ensure that an instruction which uses a result of an instruction within a different issue position receives a tag corresponding to that issue position.

Lookahead address/result calculation unit 74 receives the lookahead values from ESP/EBP lookahead units 72, the immediate data from decode units 70A–70F, and the speculative register values or result queue tags from future file 26. Lookahead address/result calculation unit 74 attempts to generate either a lookahead address corresponding to a memory operand of the instruction, or a lookahead result if the instruction does not include a memory operand. For example, simple move operations can be completed (with respect to functional units 32 and address generation units 34) if an address generation can be performed by lookahead address/result calculation unit 74. In one embodiment, lookahead address/result calculation unit 74 is configured to compute addresses using displacement only, register plus displacement, ESP/EBP plus displacement, and scale-index-base addressing mode except for index or base registers being ESP/EBP. Load/store unit 36 performs the memory operation and returns the memory operation results via result buses 48. Even if no address is generated for a memory operation by lookahead address/result calculation unit 74, lookahead address/result calculation unit 74 indicates the memory operation and corresponding result queue tag to load/store unit 36 to allocate storage within load/store unit 36 for the memory operation.

Simple arithmetic operations which increment or decrement a source operand, add/subtract a small immediate value to a source operand, or add/subtract two register source operands may also be completed via lookahead address/result calculation unit 74 if the source operands are available from future file 26 (i.e. a speculative register value is received instead of a result queue tag). Instructions completed by lookahead address/result calculation units 74 are indicated as completed and are allocated entries in reorder buffer 28 but are not dispatched to instruction windows 30. Lookahead address/result calculation unit 74 may comprise, for example, an adder for each issue position along with corresponding control logic for selecting among the lookahead values, immediate data, and speculative register values. It is noted that simple arithmetic operations may still be forwarded to instruction windows 30 for generation of condition flags, according to the present embodiment. However, generating the functional result in lookahead address/result calculation unit 74 provides the lookahead state early, allowing subsequent address generations/instructions to be performed early as well.

Lookahead address/result calculation unit 74 may be configured to keep separate lookahead copies of the ESP/EBP registers in addition to the future file copies. However, if updates to the ESP/EBP are detected which cannot be calculated by lookahead address/result calculation unit 74, subsequent instructions may be stalled until a new lookahead copy of the ESP/EBP can be provided from future file 26 (after execution of the instruction which updates ESP/EBP in the undeterminable manner).

Dispatch control unit 76 determines whether or not a group of instructions are dispatched to provide pipeline flow control. Dispatch control unit 76 receives instruction counts from instruction windows 30 and load/store counts from load/store unit 36 and, assuming the maximum possible number of instructions are in flight in pipeline stages between dispatch control units 76 and instruction windows 30 and load/store unit 36, determines whether or not space will be available for storing the instructions to be dispatched within instruction windows 30 and/or load/store unit 36 when the instructions arrive therein. If dispatch control unit 76 determines that insufficient space will be available in load/store unit 36 and either instruction window 30, dispatch is stalled until the instruction counts received by dispatch control unit 76 decrease to a sufficiently low value.

Upon releasing instructions for dispatch through dispatch control unit 76, future file 26 and reorder buffer 28 are updated with speculatively generated lookahead results. In one embodiment, the number of non-ESP/EBP updates supported may be limited to, for example, two in order to limit the number of ports on future file 26. Furthermore, operand collapse unit 78 collapses speculatively generated lookahead results into subsequent, concurrently decoded instructions which depend upon those results as indicated by the previously determined intraline dependencies. In this manner, the dependent instructions receive the speculatively generated lookahead results since these results will not subsequently be forwarded from functional units 32A–32D. Those instructions not completed by lookahead address/result calculation unit 74 are then transmitted to one of instruction windows 30A–30B based upon the issue position to which those instructions were aligned by alignment unit 22.

It is noted that certain embodiments of processor 10 may employ a microcode unit (not shown) for executing complex instructions by dispatching a plurality of simpler instructions referred to as a microcode routine. Decode units 70A–70F may be configured to detect which instructions are microcode instructions and to route the microcode instructions to the microcode unit. For example, the absence of a directly decoded instruction output from a decode unit 70 which received a valid instruction may be an indication to the microcode unit to begin execution for the corresponding valid instruction. Is further noted that various storage devices are shown in FIGS. 2 and 3 (e.g. devices 79A, 79B, and similar devices in FIG. 2 and devices 79C, 79D and similar devices in FIG. 3). The storage devices represent latches, registers, flip-flops and the like which may be used to separate pipeline stages. However, the particular pipeline stages shown in FIGS. 2 and 3 are but one embodiment of suitable pipeline stages for one embodiment of processor 10. Other pipeline stages may be employed in other embodiments.

It is noted that, while the x86 instruction set and architecture has been used as an example above and may be used as an example below, any instruction set and architecture may be used. Additionally, displacements may be any desirable size (in addition to the 8 bit and 32 bit sizes used as examples herein). Furthermore, while cache line fetching may be described herein, it is noted that cache lines may be sectors, and sectors may be fetched, if desirable based upon cache line size and the number of bytes desired to be fetched.

Figure 4:
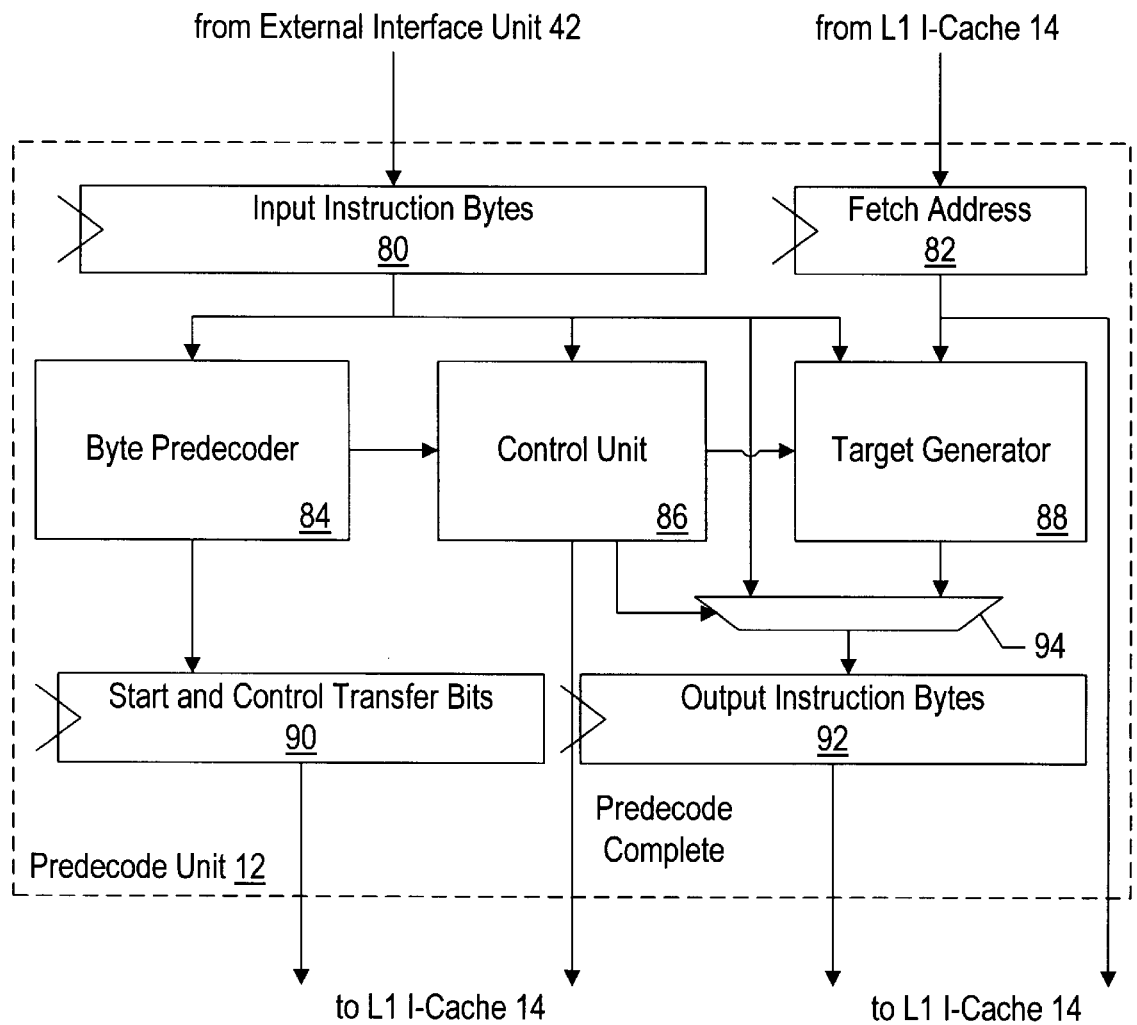
FIG. 4 is a block diagram of one embodiment of a predecode unit shown in FIG. 1.

Turning now to FIG. 4, a block diagram of one embodiment of predecode unit 12 is shown. Other embodiments are possible and contemplated. As shown in FIG. 4, predecode unit 12 includes an input instruction bytes register 80, a fetch address register 82, a byte predecoder 84, a control unit 86, a target generator 88, a start and control transfer bits register 90, an output instruction bytes register 92, and a byte select mux 94. Input instruction bytes register 80 is coupled to byte predecoder 84, control unit 86, target generator 88, byte select mux 94, and external interface unit 42. Fetch address register 82 is coupled to L1 I-cache 14 and target generator 88. Byte predecoder 84 is coupled to start and control transfer bits register 90 and control unit 86. Control unit 86 is coupled to L1 I-cache 14, byte select mux 94, and target generator 88. Target generator 88 is coupled to byte select mux 94, which is further coupled to output instruction bytes register 92. Output instruction bytes register 92 and start and control transfer bits register 90 are further coupled to L1 I-cache 14.

Upon detection of an L1 I-cache miss, predecode unit 12 receives the linear fetch address corresponding to the miss into fetch address register 82. In parallel, external interface unit 42 receives the corresponding physical fetch address and initiates an external fetch for the cache line identified by the fetch address. External interface unit 42 provides the received instruction bytes to input instruction bytes register 80.

Byte predecoder 84 predecodes the received instruction bytes to generate corresponding start and control transfer predecode bits. The generated predecode information is stored into start and control transfer bits register 90. Because instructions can have boundaries at any byte within the cache line due to the variable length nature of the x86 instruction set, byte predecoder 84 begins predecoding at the offset within the cache line specified by the fetch address stored within fetch address register 82. The byte specified by the offset is assumed to be the first byte of an instruction (i.e. the corresponding start bit is set). Byte predecoder 84 predecodes each byte beginning with the first byte to determine the beginning of each instruction and to detect branch instructions. Branch instructions result in the control transfer bit corresponding to the start byte of the branch instruction being set by byte predecoder 84. Additionally, byte predecoder 84 informs control unit 86 if the branch instruction is a relative branch instruction and indicates the position of the instruction subsequent to the branch instruction within the cache line. In one embodiment, byte predecoder 84 is configured to predecode four bytes per clock cycle in parallel.

Responsive to the signal from byte predecoder 84 indicating that a relative branch instruction has been detected, control unit 86 causes target generator 88 to generate the target address corresponding to the relative branch instruction. The displacement byte or bytes are selected from the instruction bytes stored in register 80. Additionally, the fetch address stored in fetch address register 82 (with the offset portion replaced by the position of the instruction subsequent to the branch instruction) is provided to target generator 88. Target generator 88 adds the received address and displacement byte or bytes, thereby generating the target address. The generated target address is then encoded for storage as a replacement for the displacement field of the relative branch instruction. Additionally, control unit 86 select the output of target generator 88 to be stored into output instruction bytes register 92 instead of the corresponding displacement bytes of the relative branch instruction from input instruction bytes register 80. Other instruction bytes are selected from input instruction bytes register 80 for storage in output instruction bytes register 92 as those bytes are predecoded by byte predecoder 84. Once byte predecoder 84 has completed predecode of the cache line and each relative branch instruction has had its displacement replaced by an encoding of the target address, control unit 86 asserts a predecode complete signal to L1 I-cache 14, which then stores the output instruction bytes and corresponding start and control transfer bits.

As described above, for relative branch instructions having small displacement fields (e.g. a single displacement byte) the control transfer bit corresponding to the displacement byte is used in addition to the displacement byte to store the encoding of the target address. Target generator 88 signals byte predecoder 84 with the appropriate control transfer bit, which byte predecoder 84 stores in the corresponding position within start and control transfer bits register 90.

It is noted that, if a relative branch instruction spans the boundary between two cache lines (i.e. a first cache line stores a first portion of the instruction and the succeeding cache line stored the remaining portion), predecode unit 12 may be configured to fetch the succeeding cache line in order to complete the predecoding for the relative branch instruction. It is further noted that predecode unit 12 may be configured to handle multiple outstanding cache lines simultaneously.

Figure 4A:
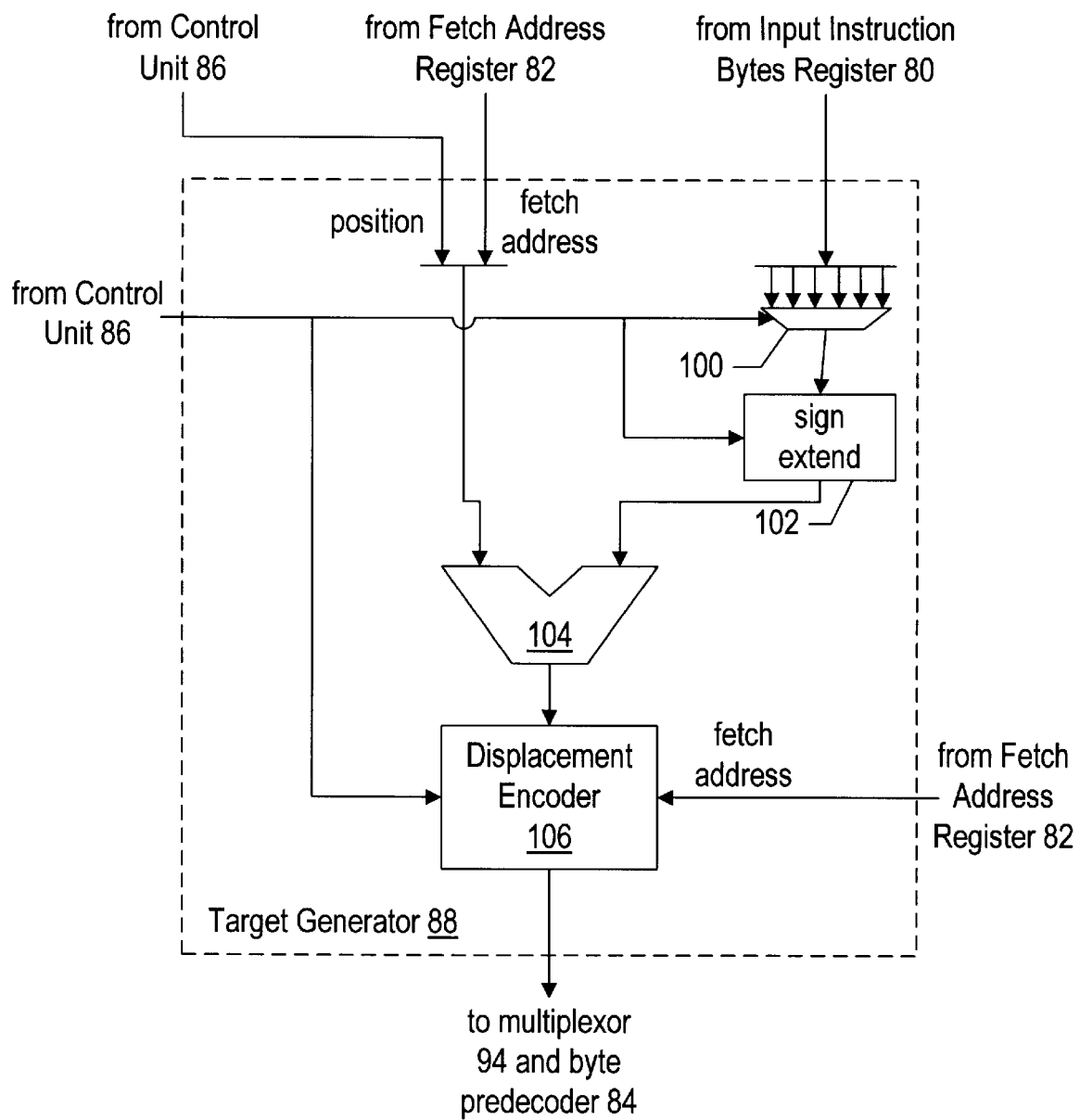
FIG. 4A is a block diagram of one embodiment of a target generator shown in FIG. 4.

Turning next to FIG. 4A, a block diagram of one embodiment of target generator 88 is shown. Other embodiments are possible and contemplated. As shown in FIG. 4A, target generator 88 includes a displacement mux 100, a sign extend block 102, an adder 104, and a displacement encoder 106. Displacement mux 100 is coupled to input instruction bytes register 80 and sign extend block 102, and receives control signals from control unit 86. Sign extend block 102 is coupled to an input of adder 104 and receives control signals from control unit 86. The second input of adder 104 is coupled to receive the fetch address from fetch address register 82 (except for the offset bits) concatenated with a position within the cache line from control unit 86. Adder 104 is further coupled to displacement encoder 106 which receives control signals from control unit 86. Displacement encoder 106 is further coupled to byte select mux 94 and byte predecoder 84.

Displacement mux 100 is used to select a displacement byte or bytes from the relative branch instruction. In the present embodiment, displacements may be one or four bytes. Accordingly, displacement mux 100 selects four bytes from input instruction bytes register 80. If a one byte displacement is included in the relative branch instruction, the displacement is selected into the least significant of the four bytes. The remaining three bytes may be zeros or may be prior bytes within input instruction bytes register 80. Sign extend block 102, under control from control unit 86, sign extends the one byte displacement to a four byte value. On the other hand, a four byte displacement is selected by displacement mux 100 and is not modified by sign extend block 102. It is noted that larger addresses may be employed by processor 10. Generally, the displacement may be sign extended to the number of bits within the address.

Displacement encoder 106 receives the target address calculated by adder 104 and encodes the target address into a format storable into the displacement bytes. In the present embodiment, a four byte displacement stores the entirety of the target address. Hence, displacement encoder 106 passes the target address unmodified to byte select mux 94 for storage in output instruction bytes register 92. Additionally, the control transfer bits corresponding to the displacement bytes are not used. For one byte displacements, the target address is encoded. More particularly, a portion of the displacement byte is used to store the offset of the target address within the target cache line (e.g. in the present embodiment, 6 bits to store a 64 byte offset). The remaining portion of the displacement byte and the corresponding control transfer bit is encoded with a value indicating the target cache line as a number of cache lines above or below the cache line identified by the fetch address stored in fetch address register 82. Accordingly, displacement encoder 106 is coupled to receive the fetch address from fetch address register 82. Displacement encoder 106 compares the fetch address to the target address to determine not only the number of cache lines therebetween, but the direction. Upon generating the encoding, displacement encoder 106 transmits the modified displacement byte to byte select mux 94 for storage in output instruction bytes register 92 and also transmits the value for the control transfer bit corresponding to the displacement byte to byte predecoder 84.

As an alternative to employing adder 104 to calculate target addresses for small displacement fields, displacement encoder 106 may directly generate the encoded target address (above below value and cache line offset) by examining the value of the displacement field and the position of the branch instruction within the cache line.

Figure 5:
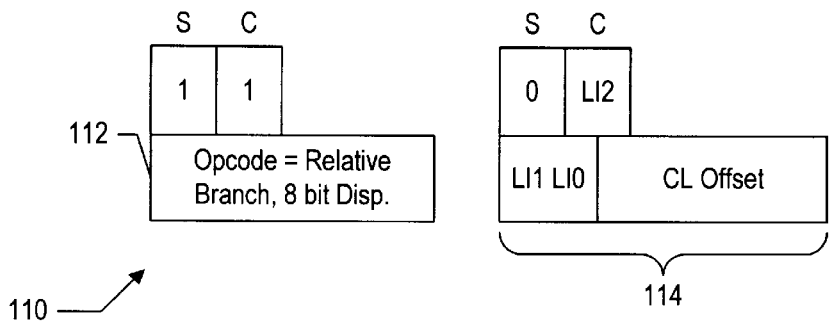
FIG. 5 is a diagram illustrating a control transfer instruction having an 8-bit offset and the corresponding predecode information according to one embodiment of the processor shown in FIG. 1.

Turning now to FIG. 5, a diagram illustrating an exemplary relative branch instruction 110 having an eight bit displacement according to the x86 instruction set is shown. Relative branch instruction 110 includes two bytes, an opcode byte 112 which is also the first byte of the instruction and a displacement byte 114. Opcode byte 112 specifies that instruction 110 is a relative branch instruction and that the instruction has an eight bit displacement. Displacement byte 114 has been updated with an encoding of the target address. The encoding includes a cache line offset portion labeled "CL offset" (which comprises six bits in the current embodiment but may comprise any number bits suitable for the corresponding instruction cache line size) and a relative cache line portion labeled "LI2" in the control transfer bit corresponding to displacement byte 114 and "LI1 LI0" within displacement byte 114.

FIG. 5 also illustrates the start and control transfer bits corresponding to instruction 110. The start bit for each byte is labeled "S" in FIG. 5 with a box indicating the value of the bit, and the control transfer bit is labeled "C" with a box indicating the value of the bit. Accordingly, the start bit corresponding to opcode byte 112 is set to indicate that opcode byte 112 is the beginning of an instruction and the control transfer bit corresponding to opcode byte 112 is also set to indicate that the instruction beginning at opcode byte 112 is a control transfer instruction. The start bit corresponding to displacement byte 114, on the other hand, is clear because displacement byte 114 is not the beginning of an instruction. The control transfer bit corresponding to displacement byte 114 is used to store a portion of the relative cache line portion of the encoded target address.

Figure 6:
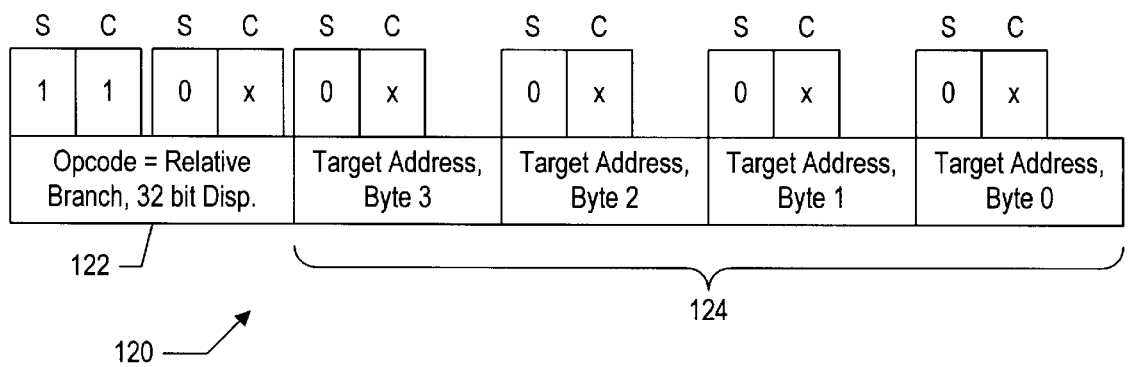
FIG. 6 is a diagram illustrating a control transfer instruction having a 32-bit offset and the corresponding predecode information according to one embodiment of the processor shown in FIG. 1.

Turning next to FIG. 6, an exemplary relative branch instruction 120 having a 32-bit displacement according to the x86 instruction set is shown. Instruction 120 includes an opcode field 122 comprising two bytes and a displacement field 124 comprising four bytes. Similar to FIG. 5, FIG. 6 illustrates the start and control transfer bits for each byte within instruction 120. Accordingly, two start bits and two control transfer bits are illustrated for opcode field 122, and one start bit and control transfer bit are illustrated for each byte within displacement field 124.

The first start bit corresponding to opcode field 122 (i.e. the start bit corresponding to the first byte of opcode field 122) is set, indicating that the first byte of opcode field 122 is the beginning of an instruction. The first control transfer bit corresponding to opcode field 122 is also set indicating that instruction 120 is a control transfer instruction. The second start bit corresponding to opcode field 122 is clear, as the second byte within opcode field 122 is not the start of instruction. The control transfer bit corresponding to the second opcode byte is a don't care (indicated by an "x").

Since displacement field 124 is large enough to contain the entirety of the target address corresponding to instruction 120, the control transfer bits corresponding to the displacement bytes are also don't cares. Each start bit corresponding to displacement byte is clear, indicating that that these bytes are not the start of an instruction.

Figure 7:
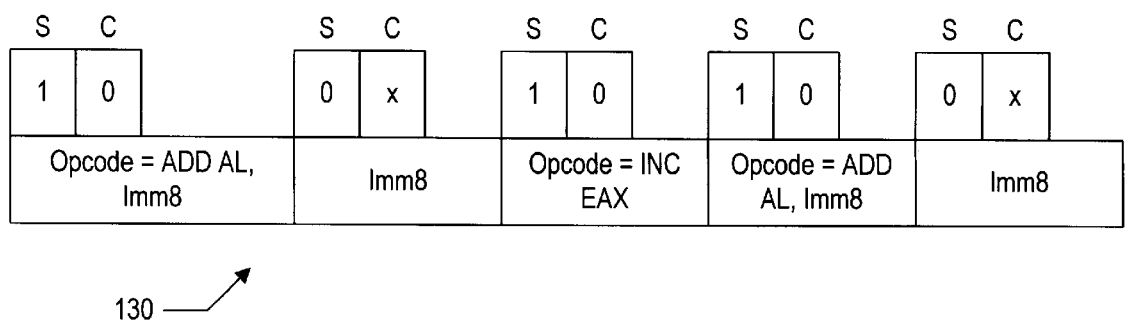
FIG. 7 is a diagram illustrating several non-control transfer instructions and the corresponding predecode information according to one embodiment of the processor shown in FIG. 1.

Turning now to FIG. 7, a diagram of an exemplary set of instructions 130 from the x86 instruction set are shown, further illustrating use of the start and control transfer bits according to one embodiment of processor 10. Similar to FIGS. 5 and 6, each byte within the set of instructions 130 is illustrated along with a corresponding start bit and control transfer bit.

The first instruction within set of instructions 130 is an add instruction which specifies addition of a one byte immediate field to the contents of the AL register and storing the result in the AL register. The add instruction is a two byte instruction in which the first byte is the opcode byte and the second byte is the one byte immediate field. Accordingly, the opcode byte is marked with a set start bit indicating the beginning of the instruction. The corresponding control transfer bit is clear indicating that the add instruction is not a branch instruction. The start bit corresponding to the immediate byte is clear because the immediate byte is not the start of an instruction, and the control transfer bit is a don't care.

Subsequent to the add instruction is a single byte instruction (an increment of the EAX register). The start bit corresponding to the instruction set because the byte is the beginning of instruction. The control transfer bit is clear since the increment is not a branch instruction.

Finally, a second add instruction specifying the addition of a one byte immediate field to the contents of the AL register is shown subsequent to the increment instruction. The start bit corresponding to the opcode of the add instruction is set, and the control transfer bit is clear. The increment instruction followed by the add instruction illustrates that consecutive bytes can have start bits which are set in the case where a single byte is both the start boundary and end boundary of the instruction.

Figure 8:
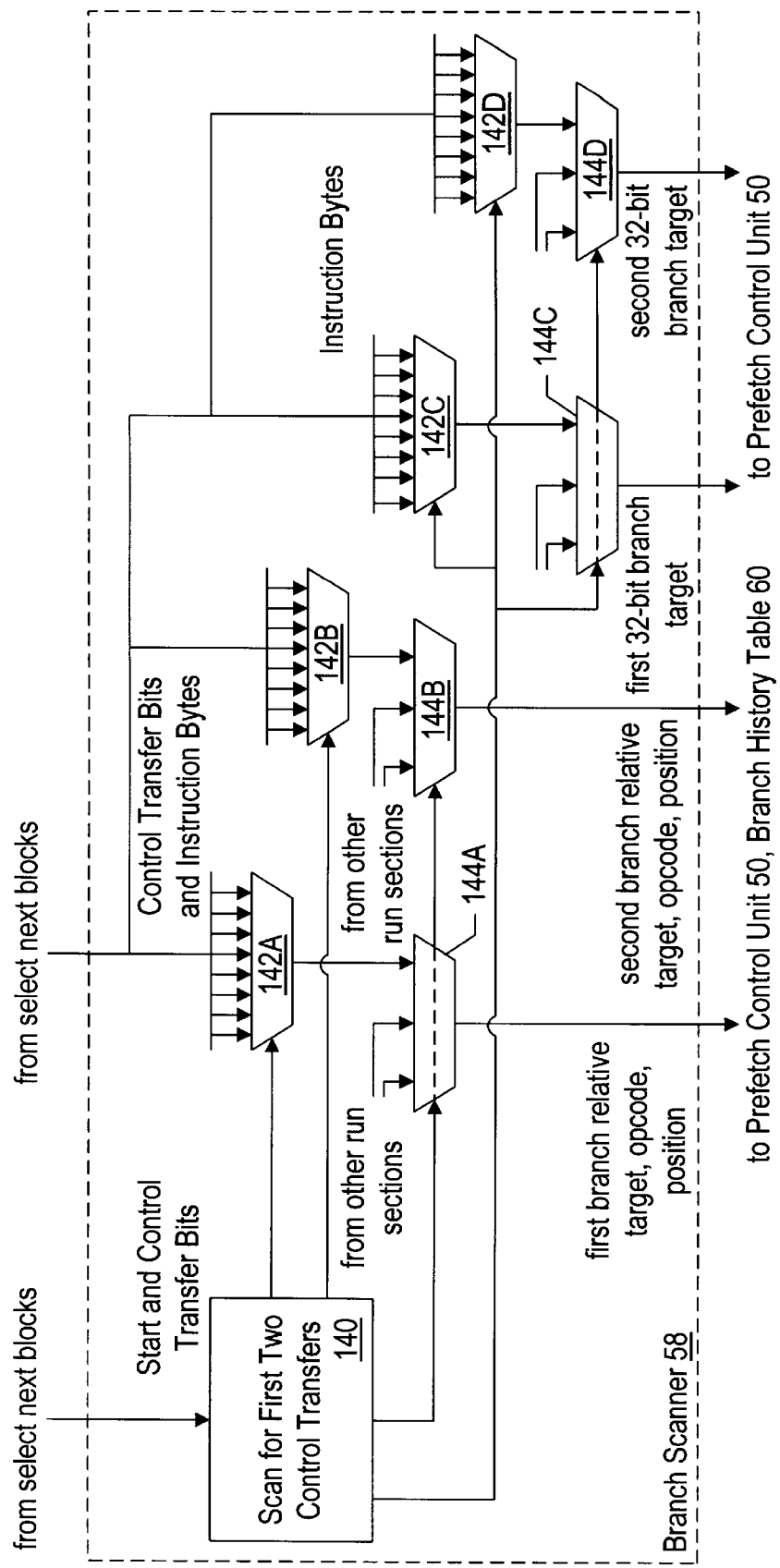
FIG. 8 is a block diagram of one embodiment of a branch scanner shown in FIG. 2.

Turning now to FIG. 8, a block diagram of one embodiment of branch scanner 58 is shown for use with the x86 instruction set. Other embodiments are possible and contemplated. In the embodiment of FIG. 8, branch scanner 58 includes a scan block 140, section target muxes 142A–142D, and run target muxes 144A–144D. Scan block 140 is coupled to receive the start and control transfer bits corresponding to a run section from select next blocks 52 through instruction select mux 54. Branch scanner 58 further includes additional scan blocks similar to scan block 140 for scanning the start and control transfer bits corresponding to the remaining run sections of the selected run. Scan block 140 is coupled to section target muxes 142A–142D to provide selection controls thereto. Additionally, scan block 140 (and similar scan blocks for the other run sections) provide selection controls for run target muxes 144A–144D. Each of section target muxes 142A–142B is coupled to receive the instruction bytes corresponding to the run section scanned by scan block 140 as well as the corresponding control transfer bits. Each of section target muxes 142C–142D are coupled receive the instruction bytes corresponding to the run section as well, but may not receive the corresponding control transfer bits. Each of section target muxes 142A–142D is coupled to respective one of run target muxes 144A–144D as shown in FIG. 8. The outputs of run target muxes 144A and 144B are coupled to prefetch control unit 50 and to branch history table 60. The outputs of run target muxes 144C and 144D are coupled to prefetch control unit 50.

Scan block 140 is configured to scan the start and control transfer bits received therein in order to locate the first two branch instructions within the run section. If a first branch instruction is identified within the run section, scan block 140 directs section target mux 142A to select the opcode byte, which is the byte for which both the start and control transfer bits are set, and the immediately succeeding byte and the control transfer bit corresponding to the immediately succeeding byte, which collectively form the encoded target address if the first branch instruction includes an eight bit relative displacement. Similarly, if a second branch instruction is identified within the run section, scan block 140 directs section target mux 142B to select the opcode byte of the second branch instruction and the immediately succeeding byte and the control transfer bit corresponding to the immediately succeeding byte. In this manner, the opcode byte and target address corresponding to the first two relative branch instructions having eight bit displacement are selected. Additionally, the position of each branch instruction within the run section is identified by scan block 140.

Scan block 140 is further configured to control section target mux 142C in response to detecting the first branch instruction. More particularly, scan block 140 selects the four consecutive instruction bytes beginning with the second byte following the start byte of the first branch instruction (i.e. beginning with the byte two bytes subsequent to the start byte of the first branch instruction within the cache line). These consecutive instruction bytes are the encoded target address if the first branch instruction includes a 32-bit relative displacement. Similarly, scan block 140 controls section target mux 142D to select the four consecutive start bytes beginning with the second byte following the start byte of the second branch instruction. In this manner, the target address corresponding to the first two relative branch instructions having 32-bit displacements are selected. Prefetch control unit 50 is configured to determine whether or not either: (i) the target address selected by section target mux 142A; (ii) the target address selected by section target mux 142C; or (iii) a target address from return stack 64 or indirect address cache 66 corresponds to the first branch instruction. Similarly, prefetch control unit 50 is configured determine whether or not either: (i) the target address selected by section target mux 142B; (ii) the target address selected by section target mux 142D; or (iii) a target address from return stack 64 or indirect address cache 66 corresponds to the second branch instruction.

Scan block 140, in conjunction with similar scan blocks for the other sections of the run, controls run target muxes 144A–144D to select target information corresponding to the first two branch instructions within the run. Accordingly, run target mux 144A selects the target address (i.e. the immediately succeeding byte and corresponding control transfer bit), opcode, and position of the first branch instruction within the run. Similarly, run target mux 144B selects the target address, opcode, and position of the second branch instruction within the run. Run target muxes 144C–144D select 32-bit target addresses corresponding to the first and second branch instructions, respectively.

Figure 9:
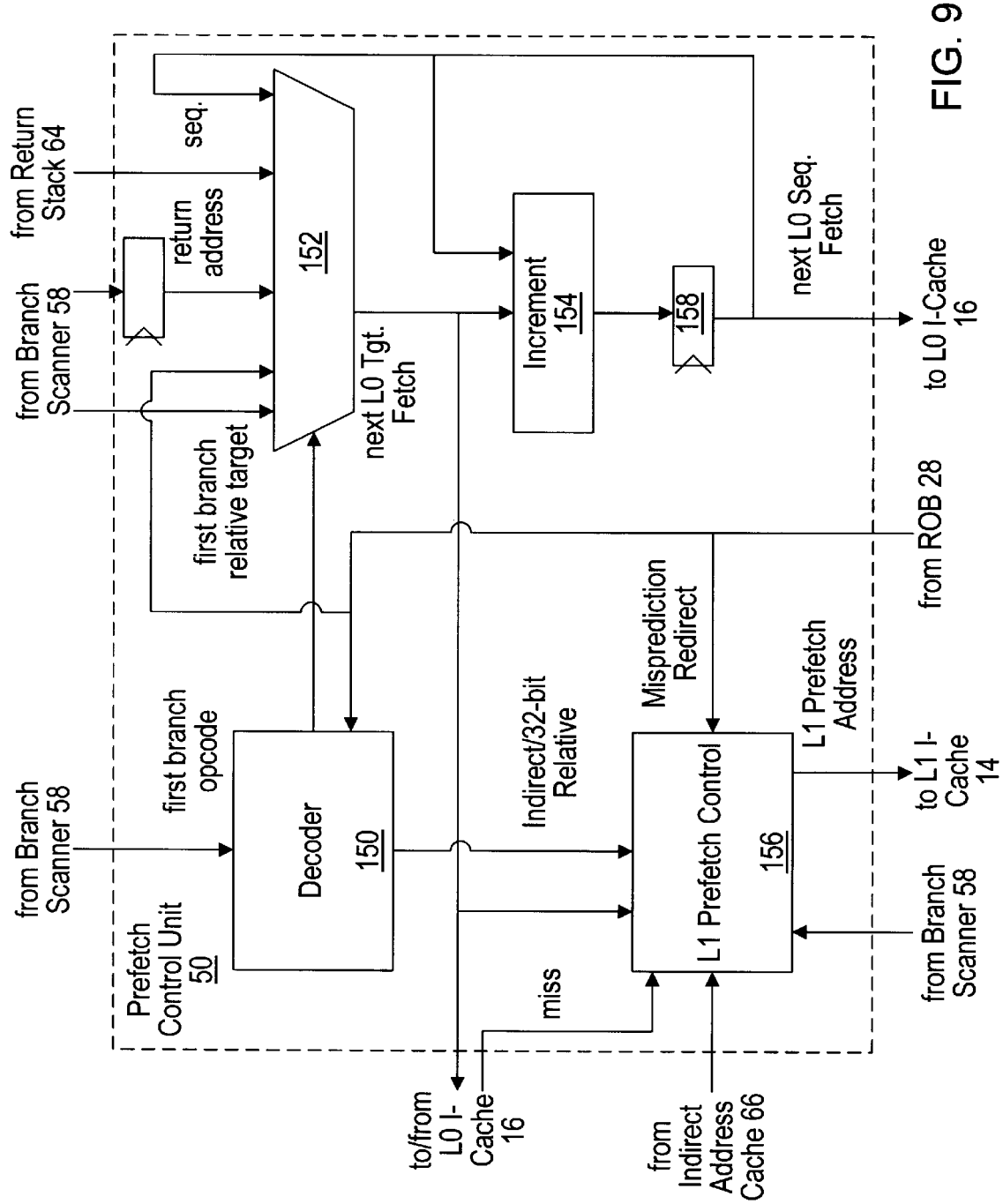
FIG. 9 is a block diagram of one embodiment of a prefetch control unit shown in FIG. 2.

Turning next to FIG. 9, a block diagram of one embodiment of prefetch control unit 50 is shown. Other embodiments are possible contemplated. As shown in FIG. 9, prefetch control unit 50 includes a decoder 150, a fetch address mux 152, an incrementor 154, and an L I prefetch control unit 156. Decoder 150 is coupled to receive the first branch opcode corresponding to the first branch instruction within the run from branch scanner 58 and to reorder buffer 28 to receive a misprediction redirection indication and corresponding corrected fetch address. Additionally, decoder 150 is coupled to fetch address mux 152 and L1 prefetch control unit 156. Fetch address mux 152 is coupled to receive the first target address corresponding to the first branch instruction within the run as selected by run target mux 144A. The second target address corresponding to the second branch instruction address is also provided to fetch address mux 152 with a one clock cycle delay. Additionally, fetch address mux 152 is configured to receive the return address provided by return stack 64, the corrected fetch address provided by reorder buffer 28 upon misprediction redirection, and the sequential address to the address fetched in the previous clock cycle (generated by incrementor 154). Fetch address mux 152 is coupled to provide the target fetch address to L0 I-cache 16 and to L1 prefetch control unit 156. L1 prefetch control unit 156 is further coupled to L0 I-cache 16 to receive a miss indication, to indirect address cache 66 to receive a predicted indirect target address, to branch scanner 58 to receive 32-bit target addresses corresponding to relative branch instructions, to reorder buffer 28 to receive branch misprediction addresses, and to L1 I-cache 14 to provide an L1 prefetch address. Prefetch control unit 50 provides a sequential fetch address to L0 I-cache 16 via a register 158.

Figure 10:
FIG. 10 is a truth table for one embodiment of the decoder shown in FIG. 9.

Decoder 150 is configured to decode the opcode correspond to the first identified branch instruction from branch scanner 58 in order to select the target fetch address for L0 I-cache 16. In order provide the target fetch address as rapidly is possible, decoder 150 decodes only a portion of the opcode byte received from branch scanner 58. More particularly, for the x86 instruction set, decoder 150 may decode the four most significant bits of the opcode byte identified by the set start and control transfer bits to select one of the first target address from branch scanner 58, the return address from return stack 64, and the sequential address. FIG. 10, described in more detail below, is a truth table corresponding to one embodiment of decoder 150. Because only a subset of the bits of the opcode byte are decoded, fewer logic levels may be employed to generate the selection controls for fetch address mux 152, thereby allowing rapid target address selection. If the target address selected responsive to the decode is incorrect, the fetched instructions may be discarded and the correct fetch address may be generated during a subsequent clock cycle.

Because the branch prediction corresponding to the first branch instruction within the run is not available until late in the clock cycle in which the fetch address is selected, decoder 150 does not attempt to select the second branch target address as the target fetch address. If the first branch instruction is predicted not taken, via branch history table 60, the second target address corresponding to the second identified branch instruction (if any) may be fetched in a subsequent clock cycle if the second branch instruction is predicted taken by branch history table 60. Also, if the first branch is predicted taken but the first target address is within the same run as the first branch, the sequential address is selected. If the first branch does not branch past the second branch within the run, the second target address is selected during the subsequent clock cycle. Similarly, if the first branch instruction uses an indirect target address or 32-bit relative target address, fetch address mux 152 may select an address and the fetched instructions may be discarded in favor of instructions at the actual branch target.

L1 prefetch control unit 156 generates an L1 prefetch address for L1 I-cache 14. The cache line corresponding to the L1 prefetch address is conveyed to L0 I-cache 16 for storage. L1 prefetch control unit 156 selects the prefetch address from one of several sources. If a branch misprediction is signalled by reorder buffer 28, the sequential address to the corrected fetch address provided by reorder buffer 28 is selected since the other address sources are based upon instructions within the mispredicted path. If no branch misprediction is signalled and an L0 fetch address miss is detected, L1 prefetch control unit 156 selects the L0 fetch address miss for prefetching. If no miss is detected, L1 prefetch control unit 156 selects either the indirect address provided by indirect address cache 66 or a 32-bit branch target address from branch scanner 58 responsive to signals from decoder 150. If no signals are received from decoder 150, L1 prefetch control unit 156 prefetches the cache line sequential to the target address selected by fetch address 152.

Indirect addresses and 32-bit target addresses are not fetched from L0 I-cache 16 because these types of target addresses are typically selected by a programmer when the target instruction sequence is not spatially located within memory near the branch instruction. Because L0 I-cache 16 stores a small number of cache lines most recently accessed in response to the code sequence being executed, it may be statistically less likely that the target instruction sequence is stored in the L0 I-cache 16.

Incrementor 154 is configured to increment the fetch address corresponding to the run selected for dispatch based on the branch prediction information received from branch history table 60. Prefetch control unit 50 includes logic (not shown) for selecting the run, via instruction select multiplexor 54, based on L0 I-cache hit information as well as the branch prediction information. This logic also causes incrementor 154 to increment the fetch address corresponding to the selected run (either the sequential fetch address provided from register 158 or the target fetch address provided from fetch address mux 152). Accordingly, the sequential fetch address for the subsequent clock cycle is generated and stored in register 158.

Turning next to FIG. 10, a truth table 160 corresponding to one embodiment of decoder 150 employed within one embodiment of processor 10 employing the x86 instruction set is shown. Other embodiments are possible and contemplated. As shown in FIG. 10, opcodes having the four most significant bits equal to (in hexadecimal) 7, E, or 0 result in the first target address being selected by fetch address mux 152. Opcodes having the four most significant bits equal to C result in the return address from return stack 64 being selected, and opcodes having the four most significant bits equal to F cause the sequential address to be selected.

Branch instruction opcodes having the four most significant bits equal to 7 are conditional jump instructions having eight bit relative displacements. Accordingly, an opcode corresponding to a set start bit and set control transfer bit which has the four most significant bits equal to 7 correctly selects the target address provided from run target mux 144A. Branch instruction opcodes having the four most significant bits equal to E may be conditional jump instructions with eight bit relative displacements, or call or unconditional jump instructions having either eight bit relative displacements or 32 bit relative displacements. For these cases, decoder 150 selects the first target address provided by run target mux 144A and, if further decode indicates that a 32-bit displacement field is included in the branch instruction, the instructions fetched in response to the selection are discarded and the correct fetch address is prefetched from L1 I-cache 14 via L1 prefetch control unit 156 receiving the 32-bit fetch address from branch scanner 58. Finally, branch instruction opcodes having the four most significant bits equal to 0 specify 32-bit relative displacements. Since decoder 150 cannot select the 32 bit target address for fetching from L0 I-cache 16 in the present embodiment, decoder 150 selects the first target address provided from branch scanner 58 and signals L1 prefetch control unit 156 to select the 32-bit branch target address from branch scanner 58 for prefetching from L1 I-cache 14.

Branch instruction opcodes having the four most significant bits equal to C are return instructions, and hence the return address provided by return address stack 64 provides the predicted fetch address. On the other hand, branch instruction opcodes having the four most significant bits equal to F are call or unconditional jump instructions which use indirect target address generation. The indirect address is not provided to fetch address mux 152, and hence a default selection of the sequential address is performed. The instructions fetched in response to the sequential address are discarded and instructions prefetched from L1 I-cache 14 are provided during a subsequent clock cycle.

As truth table 160 illustrates, predecode of just a portion of the instruction byte identified by the start and control transfer bits may be used to select a target fetch address for L0 I-cache 16. Accordingly, prefetch control unit 50 and branch scanner 58 may support high frequency, single cycle L0 I-cache access.

Figure 10A:
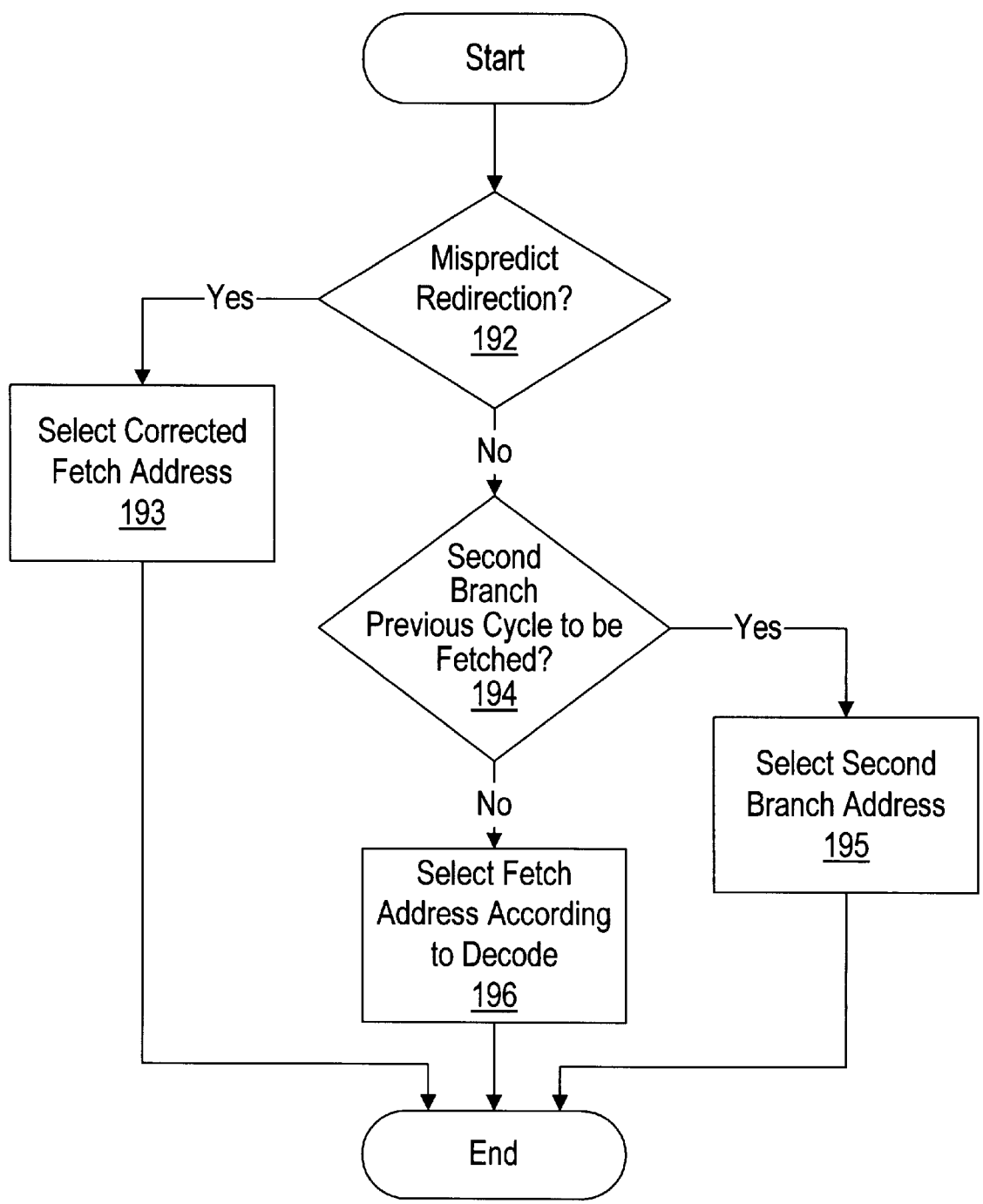
FIG. 10A is a flowchart illustrating operation of one embodiment of the decoder shown in FIG. 9.

Turning next to FIG. 10A, a flowchart is shown illustrating operation of one embodiment of decoder 150. Other embodiments are possible and contemplated. While shown as a serial series of steps in FIG. 10A, it is understood that the steps illustrated may be performed in any suitable order, and may be performed in parallel by combinatorial logic employed within decoder 150.

Decoder 150 determines if a branch misprediction is being signalled by reorder buffer 28 (decision block 192). If a misprediction is signalled, the corrected fetch address received from reorder buffer 28 is selected (step 193). On the other hand, if a misprediction is not signalled, decoder 150 determines if the second target address corresponding to the second branch instruction identified during the previous clock cycle by branch scanner 58 is to be fetched (decision block 194). The second target address may be fetched if the first branch instruction was predicted not-taken and the second branch instruction was predicted taken. Additionally, the second target address may be fetched if the first branch instruction was predicted taken, but was a small forward displacement which does not cancel the second branch instruction, and the second branch instruction was predicted taken. If the second target address is to be fetched, decoder 150 selects the second target address (which was received in the previous clock cycle and is one clock cycle delayed in reaching fetch address mux 152—step 195). Finally, if the second target address is not to be fetched, decoder 150 operates according to truth table 160 described above (step 196).

Figure 11:
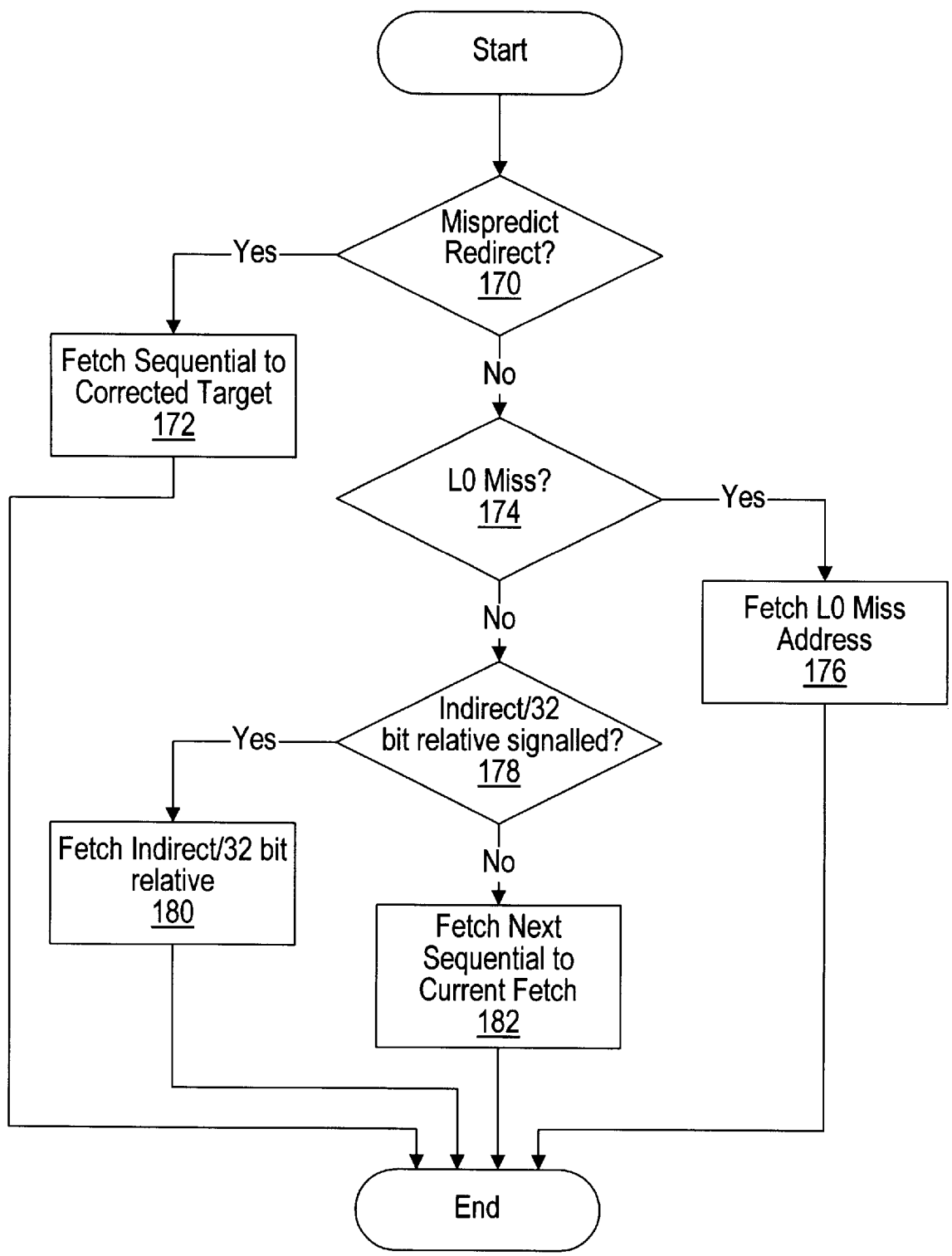
FIG. 11 is a flowchart illustrating operation of one embodiment of the L1 prefetch control unit shown in FIG. 9.

Turning now to FIG. 11, a flowchart is shown illustrating operation of one embodiment of L1 prefetch control unit 156. Other embodiments are possible and contemplated. While shown as a serial series of steps in FIG. 11, it is understood that the steps illustrated may be performed in any suitable order, and may be performed in parallel by combinatorial logic employed within L1 prefetch control unit 156.

If a branch misprediction redirection is received by L1 prefetch control unit 156 (decision block 170), the sequential cache line to the cache line corresponding to the corrected fetch address is prefetched from L1 I-cache 14 (step 172). On the other hand, if a branch misprediction redirection is not received, L1 prefetch control unit 156 determines if an L0 I-cache miss has occurred (decision block 174). If an L0 I-cache miss is detected, the address missing L0 I-cache 16 is prefetched from L1 I-cache 14 (step 176). In the absence of an L0 I-cache miss, L1 prefetch control unit 156 determines if either an indirect target address or a 32-bit relative target address has been detected by decoder 150 (decision block 178). If such a signal is received, the indirect address received from indirect address cache 66 or the 32-bit relative target address received from branch scanner 58 is prefetched from L1 I-cache 14 (step 180). Finally, if no indirect target address or 32-bit relative target address is signalled, L1 prefetch control unit 156 prefetches the next sequential cache line to the current target fetch address (step 182).

Turning now to FIG. 12, a table 190 is shown illustrating the fetch results corresponding to one embodiment of processor 10 for various target addresses and branch predictions corresponding to the first and second branch instructions identified within an instruction run. Other embodiments are possible contemplated. As used in table 190, a small forward target is a target which lies within the current run. Conversely, a large forward target is a target which does not lie within the current run. A target is forward if the target address is numerically greater than the address of the branch instruction, and backward if the target address is numerically smaller than the address of the branch instruction. The taken/not taken prediction is derived from branch history table 60. As illustrated by the footnote, results corresponding to the second branch prediction may be delayed by a clock cycle according to one embodiment. Therefore, processor 10 may assume not taken for the second branch prediction (i.e. fetch the sequential address) and, if the second branch prediction indicates taken, the fetch may be corrected during the subsequent clock cycle.

The result column in table 190 lists several results. The term "squash" when used in the result column of table 190 indicates which instructions are deleted from instruction queue 20 via signals from forward collapse unit 68 shown in FIG. 2. Additionally, the target or sequential address to be fetched responsive to the first and/or second branch instructions is indicated followed by parenthetical notation as to which of L0 I-cache 16 (L0 notation) or L1 I-cache 14 (L1 notation) the target or sequential address is conveyed.

Figure 13:
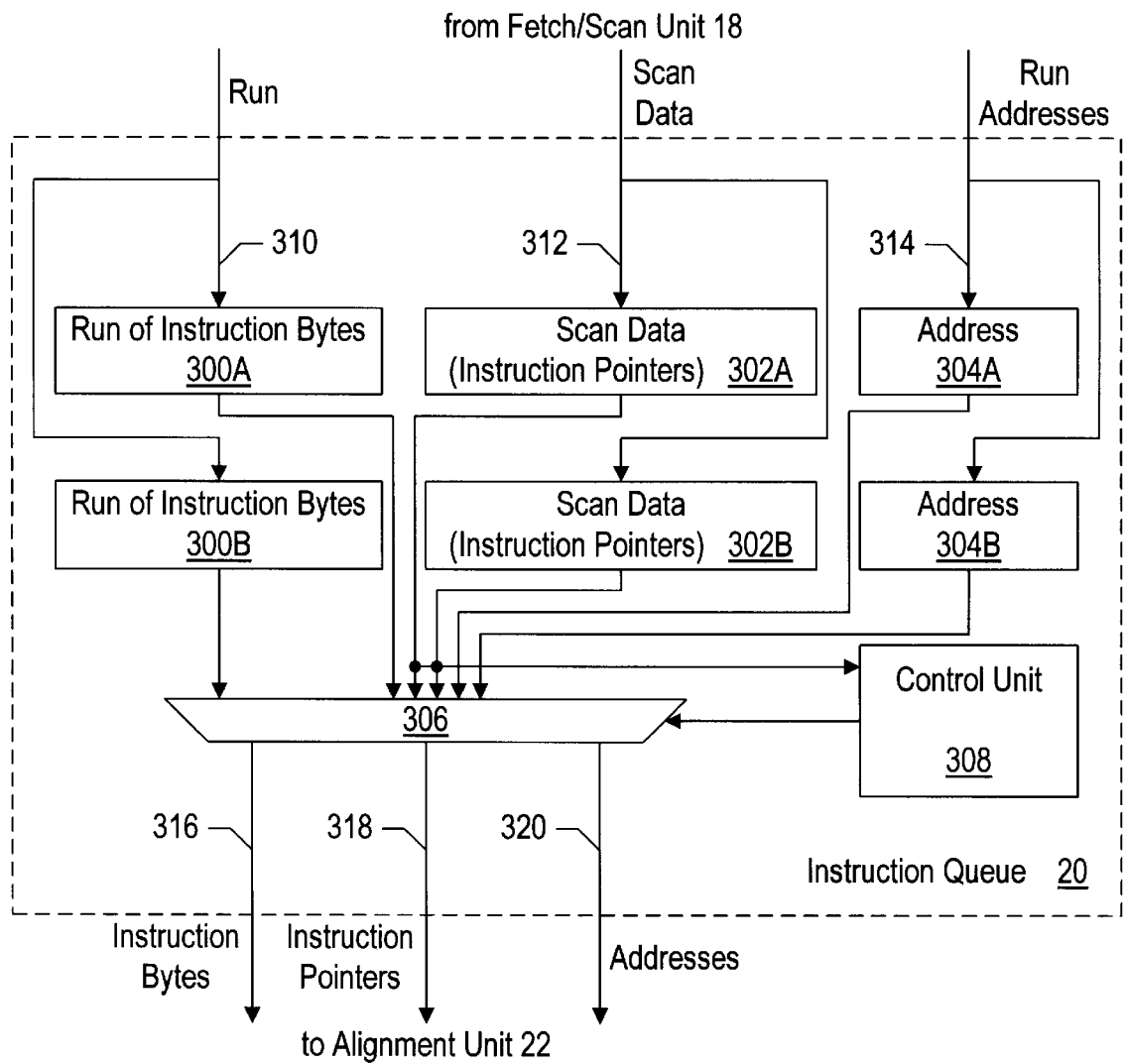
FIG. 13 is a block diagram of one embodiment of an instruction queue illustrated in FIG. 1.

Turning next to FIG. 13, a block diagram of one exemplary embodiment of instruction queue 20 is shown. Other embodiments are possible and contemplated. In the embodiment of FIG. 13, instruction queue 20 includes run storages 300A–300B, scan data storages 302A–302B, and address storages 304A–304B. Additionally, instruction queue 20 includes a mux 306 and a control unit 308. A run of instructions is provided to instruction queue 20 from fetch/scan unit 18 via a run bus 310; corresponding scan data is provided on a scan data bus 312; and corresponding addresses (one per run section) are provided on a run addresses bus 314. Instruction queue 20 provides a set of selected instruction bytes to alignment unit 22 on instruction bytes bus 316, pointers to instructions within the instruction bytes on an instruction pointers bus 318, and addresses for the run sections comprising the set of selected instruction bytes on an addresses bus 320. Run bus 310 is coupled to run storages 300A–300B, while scan data bus 312 is coupled to scan data storages 302A–302B and address storages 304A–304B are coupled to run addresses bus 314. Storages 300A–300B, 302A–302B, and 304A–304B are coupled to mux 306, which is further coupled to buses 316–320. Control unit 308 is coupled to mux 306 and scan data storages 302A–302B.

Fetch/scan unit 18, and more particularly instruction scanner 56 according to the embodiment of FIG. 2, provides a run of instructions and associated information to instruction queue 20 via buses 310–314. Control unit 308 allocates one of run storages 300A–300B for the instruction bytes comprising the instruction run, and a corresponding scan data storage 302A–302B and address storage 304A–304B for the associated information. The scan data includes instruction pointers which identify: (i) the start byte and end byte as offsets within a-run section; as well as (ii) the run section within which the instruction resides. According to one particular embodiment, up to five instructions may be identified within an eight byte run section, and there are up to three run sections in a run for a total of up to 15 instructions pointers stored within a scan data storage 302. Additionally, address storages 304 store an address corresponding to each run section.

Control unit 308 examines the instructions pointers within scan data storages 302A–302B to identify instructions within a set of contiguous run sections for dispatch to alignment unit 22. In one particular embodiment, up to six instructions are identified within up to four contiguous run sections. The run sections may be stored in one of run storages 300A or 300B, or some run sections may be selected from one of run storages 300A–300B and the other run sections may be selected from the other one of run storages 300A–300B. A first run section is contiguous to a second run section if the first run section is next, in speculative program order, to the second run section. It is noted that mux 306, while illustrated as a single mux in FIG. 13 for simplicity in the drawing, may be implemented by any suitable parallel or cascaded set of multiplexors.

Control unit 308 provides a set of selection signals to mux 306 to select the set of run sections including the selected instructions, as well as the instruction pointers corresponding to the selected instructions. Additionally, the address for each selected run section is selected. The run sections are provided upon instruction bytes bus 316, while the corresponding instruction pointers and addresses are provided upon instruction pointers bus 318 and addresses bus 320, respectively.

Turning next to FIG. 14, a block diagram of one embodiment of future file 26 and reorder buffer/register file 28 is shown in more detail. Other embodiments are possible and contemplated. In the embodiment of FIG. 14, future file 26 is shown along with a register file 28A and a reorder buffer 28B. Future file 26 is coupled to register file 28A, result buses 48, a set of source operand address buses 330, a set of source operand buses 332, and a set of lookahead update buses 334. Reorder buffer 28B is coupled to register file 28A, result buses 48, and dispatched instructions buses 336.

As instructions are decoded by decode units 70 within lookahead/collapse unit 24, the register source operands of the instructions are routed to future file 26 via source operand address buses 330. Future file 26 provides either the most current speculative value of each register, if the instruction generating the most current value has executed, or a reorder buffer tag identifying the instruction which will generate the most current value, upon source operands buses 332. Additionally, one of the source operands may be indicated to be a destination operand. Future file 26 updates the location corresponding to the destination register with the reorder buffer tag to be assigned to the corresponding instruction in response to the destination operand.

Future file 26 additionally receives updates from lookahead/collapse unit 24. Lookahead results generated by lookahead address/result calculation unit 74 are provided to future file 26 via lookahead update buses 334. By providing lookahead updates from lookahead address/result calculation unit 74, speculative execution results may be stored into future file 26 more rapidly and may thereby be available more rapidly to subsequently executing instructions. Subsequent instructions may thereby be more likely to achieve lookahead result calculation. In one embodiment, to reduce the number of ports on future file 26, the number of lookahead updates is limited (for example, 2 updates may be allowable). Since the ESP updates are already captured by lookahead/collapse unit 24, those updates need not be stored into future file 26. Furthermore, not every issue position will have a speculative update for future file 26. Accordingly, fewer speculative updates, on average, may be needed in future file 26 and therefore limiting the number of updates may not reduce performance.

Instruction results are provided upon result buses 48. Future file 26 receives the results and compares the corresponding reorder buffer tags (also provided upon result buses 48) to the reorder buffer tags stored therein to determine whether or not the instruction result comprises the most recent speculative update to one of the architected registers. If the reorder buffer tag matches one of the reorder buffer tags in the future file, the result is capture by future file 26 and associated with the corresponding architected register.

Future file 26 is coupled to register file 28A to receive a copy of the architected registers stored therein when an exception/branch misprediction is detected and retired. Reorder buffer 28B may detect exceptions and branch mispredictions from the results provided upon result buses 48, and may signal register file 28A and future file 26 if a copy of the architected registers as retired in register file 28A is to be copied to future file 26. For example, upon retiring an instruction having an exception or branch misprediction, the copy may be performed. In this manner, future file 26 may be recovered from incorrect speculative execution.

Reorder buffer 28B receives the dispatched instructions from lookahead/collapse unit 24 via dispatched instructions bus 336. The dispatched instructions may be provided to reorder buffer 28B upon a determination by dispatch control unit 76 that instructions are to be dispatched. Additionally, reorder buffer 28B receives execution results upon results buses 48 and retires the results, in program order, to register file 28A.

Figure 15:
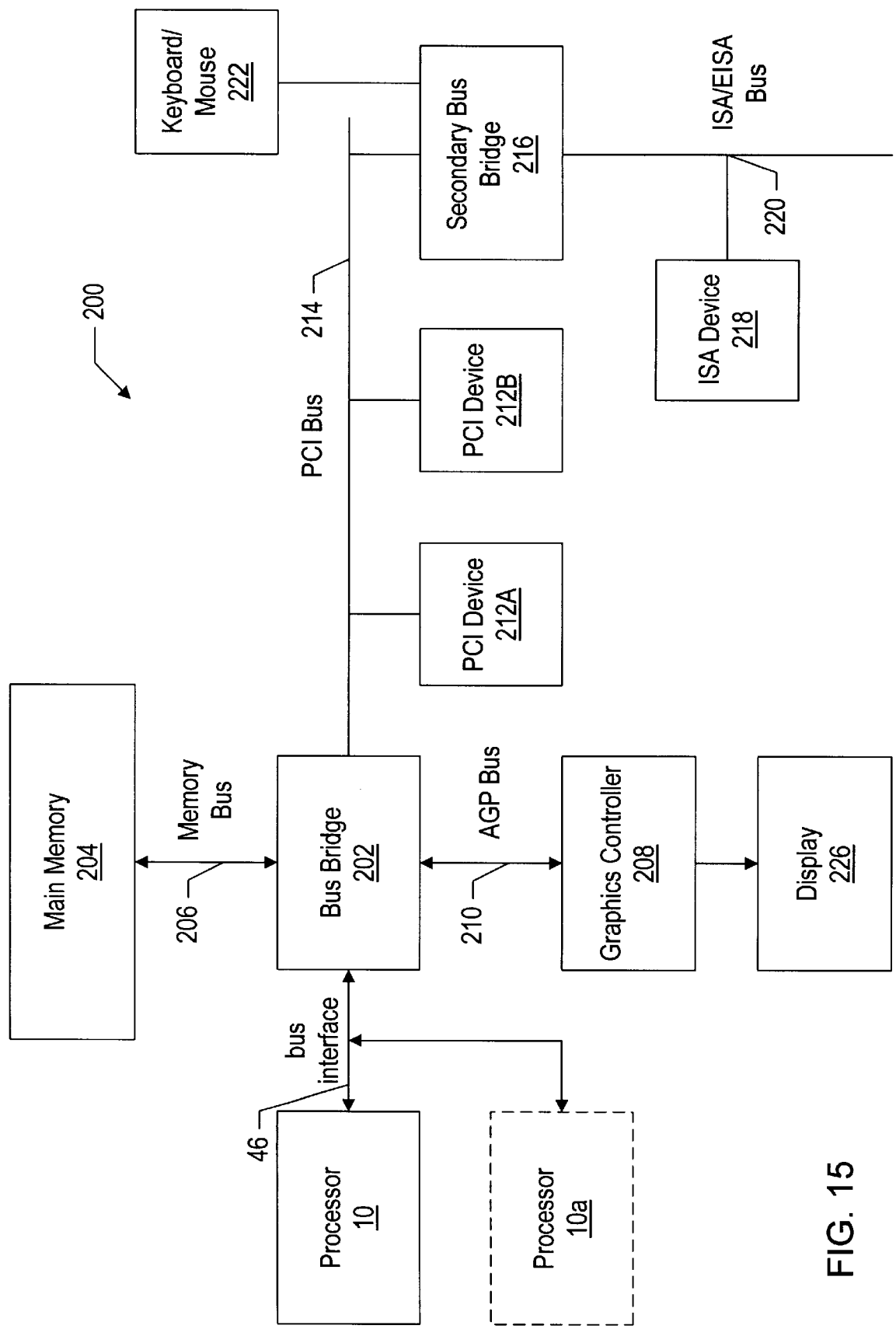
FIG. 15 is a block diagram of one embodiment of a computer system including the processor shown in FIG. 1.

Turning now to FIG. 15, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be ffectively shifted into and from main memory 204. Graphics controller 208 may herefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 15) or may be connected to bus bridge 202 via an independent bus.

Numerous variations and modifications will become apparent to those skilled in the art once the above disclosure is fully appreciated. It is intended that the following claims be interpreted to embrace all such variations and modifications.

What is claimed is:

1. A processor comprising:
   a branch scanner configured to scan predecode information corresponding to a plurality of instruction bytes fetched by said processor for execution, said predecode information including a boundary indication corresponding to each of said plurality of instruction bytes and a control transfer indication corresponding to said each of said plurality of instruction bytes, and wherein said branch scanner is configured to select an instruction byte from said plurality of instruction bytes, said instruction byte having a corresponding boundary indication indicating that said instruction byte is a boundary of an instruction and a corresponding control transfer indication indicating that said instruction is a control transfer instruction; and
   a prefetch control unit coupled to said branch scanner, wherein said prefetch control unit is configured to select a next fetch address from a plurality of addresses corresponding to a plurality of types of control transfer instructions, said prefetch control unit configured to receive said instruction byte and to decode a portion of said instruction byte, said portion indicative of which of said plurality of types corresponds to said instruction, and wherein said prefetch control unit is configured to select said next fetch address in response to decoding the portion.

2. The processor as recited in claim 1 wherein said instruction byte is an opcode byte of said instruction, wherein a combination of the bits within said instruction byte identifies said instruction within an instruction set executed by said processor.

3. The processor as recited in claim 2 wherein said portion of said instruction byte comprises one or more most significant bits of said opcode byte.

4. The processor as recited in claim 3 wherein said portion of said instruction byte is four most significant bits of said opcode byte.

5. The processor as recited in claim 1 wherein one of said plurality of addresses is a relative target address provided by said branch scanner.

6. The processor as recited in claim 5 wherein said relative target address is encoded into said instruction and corresponding predecode information.

7. The processor as recited in claim 6 further comprising a predecode unit configured to predecode said plurality of instruction bytes prior to fetch thereof by said processor, wherein said predecode unit is configured to generate said boundary indications and said control transfer indications.

8. The processor as recited in claim 7 wherein said predecode unit is further configured to detect a displacement of a relative control transfer instruction and is configured to add an address to said displacement to generate said relative target address, and wherein said predecode unit is configured to replace said displacement within said relative control transfer instruction with an encoding of said relative target address.

9. The processor as recited in claim 5 wherein another one of said plurality of addresses is a return address.

10. The processor as recited in claim 9 wherein yet another one of said plurality of addresses is a sequential address.

11. A method for selecting a next fetch address in a processor, the method comprising:
    selecting an instruction byte from a plurality of instruction bytes previously fetched by said processor, said instruction byte selected by scanning predecode information corresponding to said plurality of instruction bytes, said instruction byte being identified by said predecode information as a boundary of a control transfer instruction;
    decoding a portion of said instruction byte, said portion indicative of which of a plurality of types of control transfer instructions corresponds to said control transfer instruction; and
    selecting one of a plurality of source addresses corresponding to said plurality of types as said next fetch address responsive to said decoding.

12. The method as recited in claim 11 wherein said selecting one of said plurality of source addresses comprises selecting a first one of said plurality of source addresses if said portion of said instruction byte indicates that said instruction is a relative control transfer instruction.

13. The method as recited in claim 12 wherein said first one of said plurality of source addresses is derived from an additional one or more of said plurality of instruction bytes, wherein said additional one or more of said plurality of instruction bytes are within said relative control transfer instruction.

14. The method as recited in claim 13 wherein said additional one or more of said plurality of instruction bytes comprise an encoded target address corresponding to said relative control transfer instruction.

15. The method as recited in claim 14 further comprising predecoding said relative control transfer instruction to generate said encoded target address by adding a displacement within said relative control transfer instruction to an address as defined by an instruction set employed by the processor.

16. The method as recited in claim 12 wherein said selecting one of said plurality of source addresses comprises selecting a second one of said plurality of source addresses if said portion of said instruction byte indicates that said instruction is a return instruction.

17. The method as recited in claim 11 wherein said instruction byte is an opcode byte in which the combination of the bits of the opcode byte define an opcode of said control transfer instruction.

18. The method as recited in claim 17 wherein said portion of said instruction byte comprises one or more most significant bits of said instruction byte.

19. A computer system comprising:
    a processor including:
        a branch scanner configured to scan predecode information corresponding to a plurality of instruction bytes fetched by said processor for execution, said predecode information including a boundary indication corresponding to each of said plurality of instruction bytes and a control transfer indication corresponding to said each of said plurality of instruction bytes, and wherein said branch scanner is configured to select an instruction byte from said plurality of instruction bytes, said instruction byte having a corresponding boundary indication indicating that said instruction byte is a boundary of an instruction and a corresponding control transfer indication indicating that said instruction is a control transfer instruction; and a prefetch control unit coupled to said branch scanner, wherein said prefetch control unit is configured to select a next fetch address from a plurality of addresses corresponding to a plurality of types of control transfer instructions, said prefetch control unit configured to receive said instruction byte and to decode a portion of said instruction byte, said portion indicative of which of said plurality of types corresponds to said instruction, and wherein said prefetch control unit is configured to select said next fetch address in response to decoding the portion;

a memory coupled to said processor, wherein said memory is configured to store said plurality of instruction bytes and to provide said plurality of instruction bytes to said processor; and an input/output (I/O) device configured to transfer data between said computer system and another computer system coupled to said I/O device.

20. The computer system as recited in claim 19 further comprising a second processor configured identically to said processor.

21. The computer system as recited in claim 19 further comprising a second processor including:

a branch scanner configured to scan predecode information corresponding to a plurality of instruction bytes fetched by said processor for execution, said predecode information including a boundary indication corresponding to each of said plurality of instruction bytes and a control transfer indication corresponding to said each of said plurality of instruction bytes, and wherein said branch scanner is configured to select an instruction byte from said plurality of instruction bytes, said instruction byte having a corresponding boundary indication indicating that said instruction byte is a boundary of an instruction and a corresponding control transfer indication indicating that said instruction is a control transfer instruction; and a prefetch control unit coupled to said branch scanner, wherein said prefetch control unit is configured to select a next fetch address from a plurality of addresses corresponding to a plurality of types of control transfer instructions, said prefetch control unit configured to receive said instruction byte and to decode a portion of said instruction byte, said portion indicative of which of said plurality of types corresponds to said instruction, and wherein said prefetch control unit is configured to select said next fetch address in response to decoding the portion.

22. A processor comprising:

a branch scanner configured to scan predecode information corresponding to a plurality of instruction bytes fetched by said processor for execution, wherein said branch scanner is configured to select an instruction byte from said plurality of instruction bytes, said instruction byte identified by said predecode information as a boundary of a control transfer instruction; and a prefetch control unit coupled to said branch scanner, wherein said prefetch control unit is configured to select a next fetch address from a plurality of addresses corresponding to a plurality of types of control transfer instructions, said prefetch control unit configured to receive said instruction byte and to decode a portion of said instruction byte, said portion indicative of which of said plurality of types corresponds to said instruction, and wherein said prefetch control unit is configured to select said next fetch address in response to decoding the portion.

23. The processor as recited in claim 22 wherein said instruction byte is an opcode byte of said instruction.

24. The processor as recited in claim 23 wherein said portion of said instruction byte comprises one or more most significant bits of said opcode byte.

25. The processor as recited in claim 24 wherein said portion of said instruction byte is four most significant bits of said opcode byte.

26. The processor as recited in claim 22 wherein one of said plurality of addresses is a relative target address provided by said branch scanner.

27. The processor as recited in claim 26 wherein said relative target address is encoded into said instruction and corresponding predecode information.

28. The processor as recited in claim 27 further comprising a predecode unit configured to predecode said plurality of instruction bytes prior to fetch thereof by said processor, wherein said predecode unit is configured to generate said predecode information, and wherein said predecode unit is further configured to detect a displacement of a relative control transfer instruction and is configured to add an address to said displacement to generate said relative target address, and wherein said predecode unit is configured to replace said displacement within said relative control transfer instruction with an encoding of said relative target address.

29. The processor as recited in claim 22 wherein one of said plurality of addresses is a return address.

30. The processor as recited in claim 22 wherein one of said plurality of addresses is a sequential address.

31. A computer system comprising:

a processor comprising:

a branch scanner configured to scan predecode information corresponding to a plurality of instruction bytes fetched by said processor for execution, wherein said branch scanner is configured to select an instruction byte from said plurality of instruction bytes, said instruction byte identified by said predecode information as a boundary of a control transfer instruction; and a prefetch control unit coupled to said branch scanner, wherein said prefetch control unit is configured to select a next fetch address from a plurality of addresses corresponding to a plurality of types of control transfer instructions, said prefetch control unit configured to receive said instruction byte and to decode a portion of said instruction byte, said portion indicative of which of said plurality of types corresponds to said instruction, and wherein said prefetch control unit is configured to select said next fetch address in response to decoding the portion; and a memory coupled to said processor, wherein said memory is configured to store said plurality of instruction bytes and to provide said plurality of instruction bytes to said processor; and an input/output (I/O) device configured to transfer data between said computer system and another computer system coupled to said I/O device.

32. The computer system as recited in claim 31 further comprising a second processor including:

a branch scanner configured to scan predecode information corresponding to a plurality of instruction bytes fetched by said processor for execution, wherein said branch scanner is configured to select an instruction byte from said plurality of instruction bytes, said instruction byte identified by said predecode information as a boundary of a control transfer instruction; and a prefetch control unit coupled to said branch scanner, wherein said prefetch control unit is configured to select a next fetch address from a plurality of addresses corresponding to a plurality of types of control transfer instructions, said prefetch control unit configured to receive said instruction byte and to decode a portion of said instruction byte, said portion indicative of which of said plurality of types corresponds to said instruction, and wherein said prefetch control unit is configured to select said next fetch address in response to decoding the portion.

33. The computer system as recited in claim 31 wherein said prefetch control unit is further configured to decode a remaining portion of said instruction byte to verify which of said plurality of types corresponds to said instruction.

34. The computer system as recited in claim 19 wherein said prefetch control unit is further configured to decode a remaining portion of said instruction byte to verify which of said plurality of types corresponds to said instruction.

35. The processor as recited in claim 1 wherein said prefetch control unit is further configured to decode a remaining portion of said instruction byte to verify which of said plurality of types corresponds to said instruction.

36. The processor as recited in claim 22 wherein said prefetch control unit is further configured to decode a remaining portion of said instruction byte to verify which of said plurality of types corresponds to said instruction.

37. The method as recited in claim 11 further comprising decoding a remaining portion of said instruction byte to verify which of said plurality of types corresponds to said control transfer instruction.

\* \* \* \* \*